(12) United States Patent
Yoshizawa et al.

(10) Patent No.: US 10,976,641 B2
(45) Date of Patent: Apr. 13, 2021

(54) BLADE DRIVING DEVICE AND OPTICAL APPARATUS

(71) Applicant: CANON DENSHI KABUSHIKI KAISHA, Chichibu (JP)

(72) Inventors: Takahito Yoshizawa, Kawaguchi (JP); Mitsuo Shibata, Matsudo (JP)

(73) Assignee: Canon Denshi Kabushiki Kaisha, Chichibu (JP)

( * ) Notice: Subject to any disclaimer, the term of this patent is extended or adjusted under 35 U.S.C. 154(b) by 0 days.

(21) Appl. No.: 15/899,491

(22) Filed: Feb. 20, 2018

(65) Prior Publication Data

US 2018/0180971 A1  Jun. 28, 2018

Related U.S. Application Data

(63) Continuation of application No. PCT/JP2016/077553, filed on Sep. 16, 2016.

(30) Foreign Application Priority Data

Sep. 16, 2015  (JP) .............................. JP2015-183228

(51) Int. Cl.
*G03B 9/06* (2021.01)
*G02B 5/00* (2006.01)
*G03B 9/10* (2021.01)

(52) U.S. Cl.
CPC ............... *G03B 9/06* (2013.01); *G02B 5/005* (2013.01); *G03B 9/10* (2013.01)

(58) Field of Classification Search
CPC .................................. G03B 9/005; G03B 9/06
See application file for complete search history.

(56) References Cited

U.S. PATENT DOCUMENTS

| 4,199,247 A | * | 4/1980 | Schwarz | .................. G03B 9/07 |
| | | | | 396/509 |
| 7,085,032 B2 | | 8/2006 | Sato | |
| 2006/0033974 A1 | * | 2/2006 | Sato | ......................... G03B 9/06 |
| | | | | 359/227 |

FOREIGN PATENT DOCUMENTS

| JP | H04-031129 U | | 3/1992 | |
| JP | H09-189936 | * | 7/1997 | ............... G03B 9/02 |

(Continued)

OTHER PUBLICATIONS

Nov. 22, 2016 International Search Report in International Patent Appln. No. PCT/JP2016/077553.

(Continued)

*Primary Examiner* — Noam Reisner
(74) *Attorney, Agent, or Firm* — Venable LLP

(57) ABSTRACT

A blade driving device includes an opening forming member, and a plurality of groups of blades that are pivotably disposed in a ring form around an opening portion of the opening forming member. The plurality of groups of blades include a first group of blades and a second group of blades, in a process of changing from a first circular light passage opening formed by the first group to a second circular light passage opening formed by the second group, the first group that is adjacent to the second group and has finished forming the first circular light passage opening remains in the opening portion, thereby acting to substantially suppress warp, in an optical axis direction, of the second group that forms the second circular light passage opening on an inner side thereof.

8 Claims, 24 Drawing Sheets

(56) References Cited

FOREIGN PATENT DOCUMENTS

| JP | H09-189936 A | | 7/1997 | | |
|----|----|----|----|----|----|
| JP | 2004-184486 A | | 7/2004 | | |
| JP | 2006-053409 A | | 2/2006 | | |
| JP | 2007-163827 A | | 6/2007 | | |
| JP | 2012-123299 A | | 6/2012 | | |
| JP | 2013-029693 A | | 2/2013 | | |
| JP | 2013029693 A | * | 2/2013 | ............... | G03B 9/02 |
| JP | 2014-206768 A | | 10/2014 | | |
| JP | 2014206768 A | * | 10/2014 | ............... | G03B 9/00 |

OTHER PUBLICATIONS

Aug. 31, 2020 Japanese Official Action in Japanese Patent Appln. No. 2016-181466.

\* cited by examiner

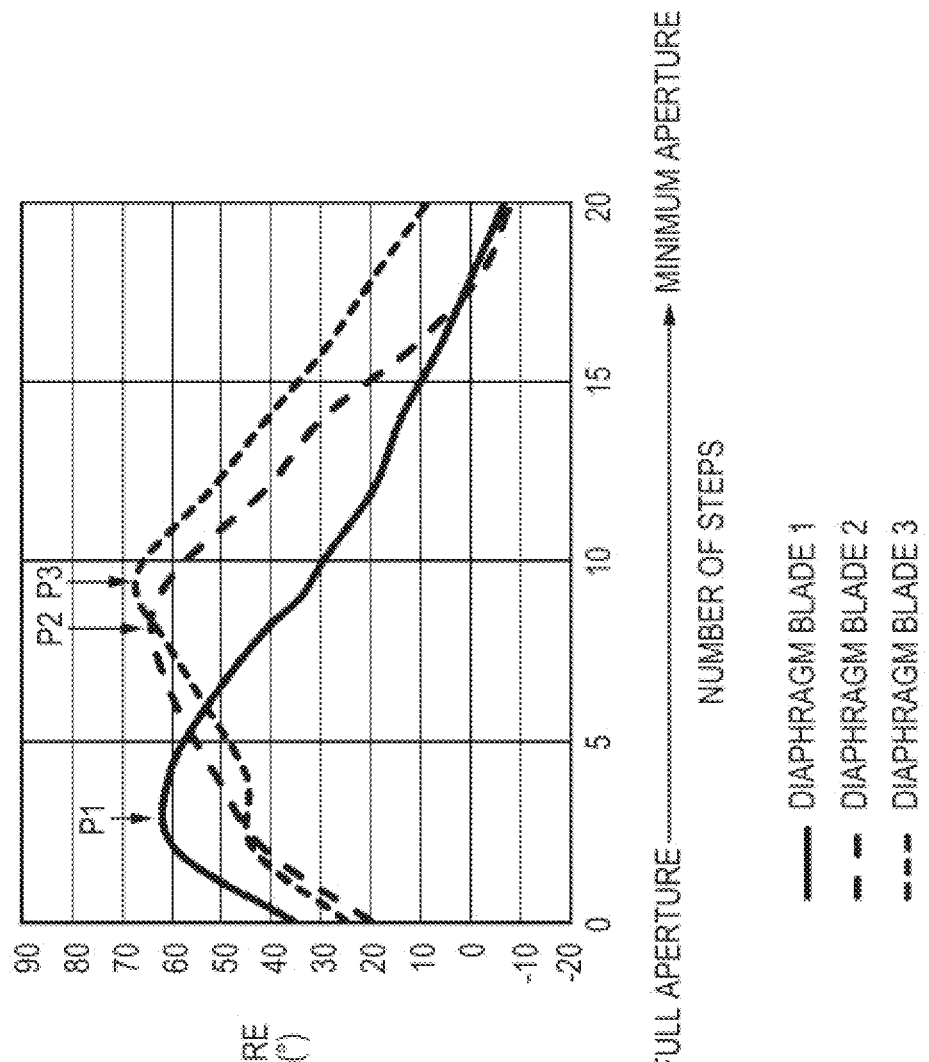

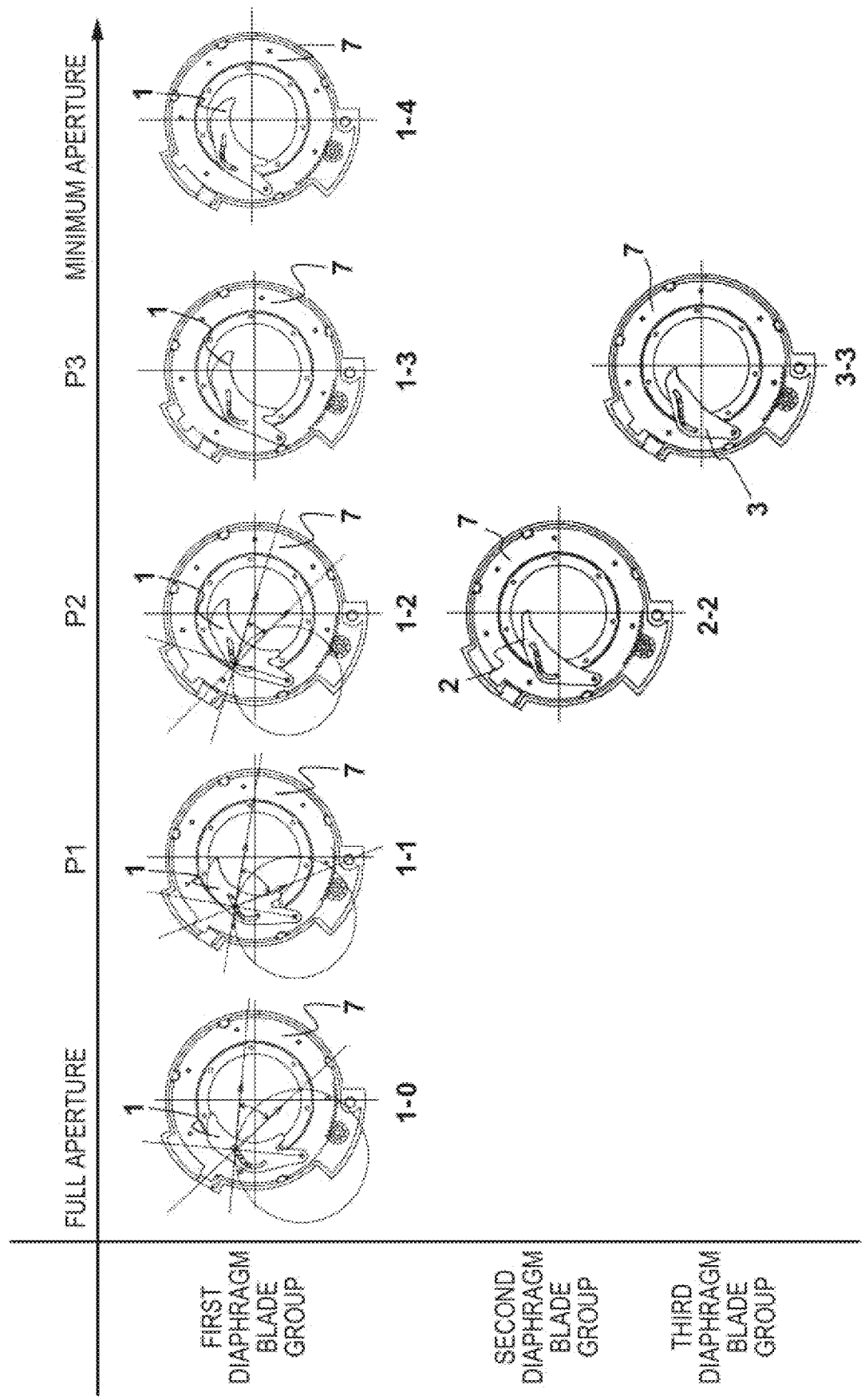

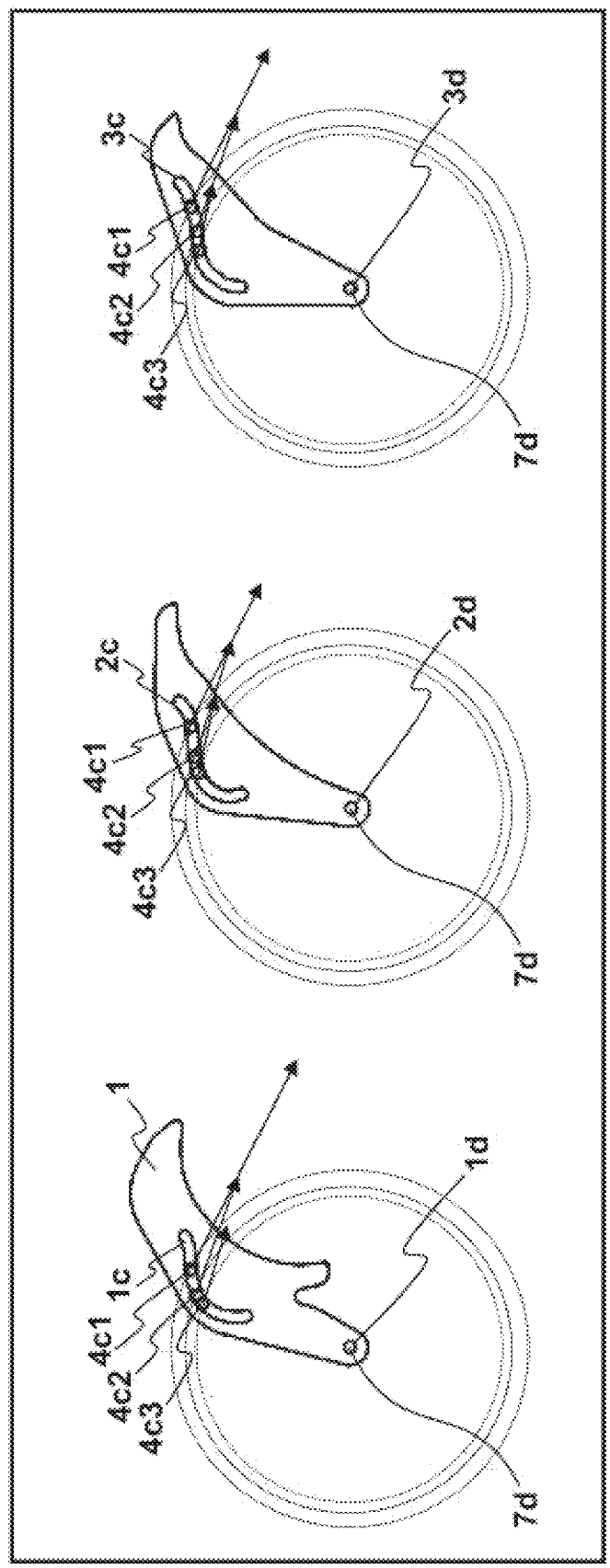

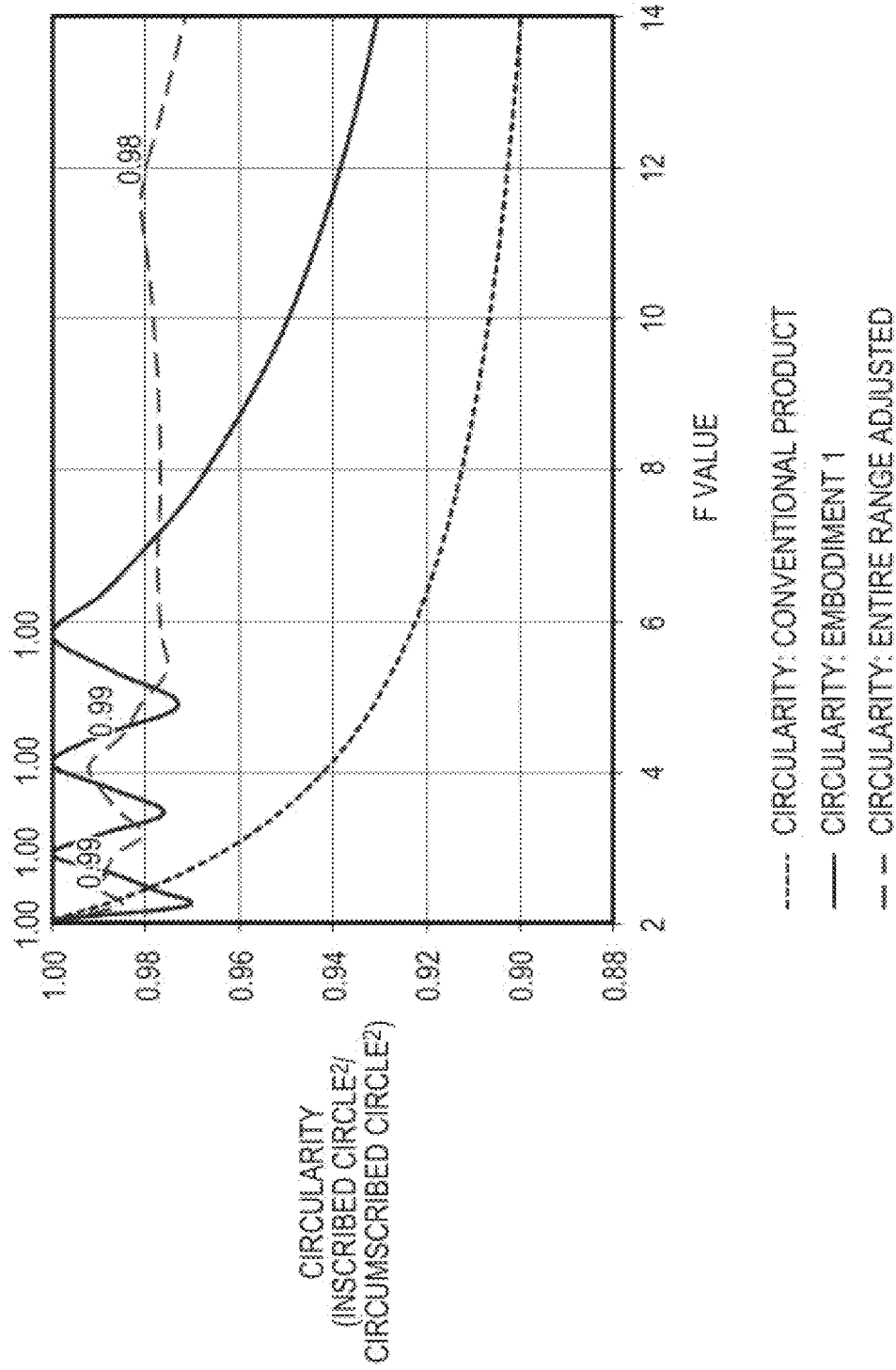

F I G. 13
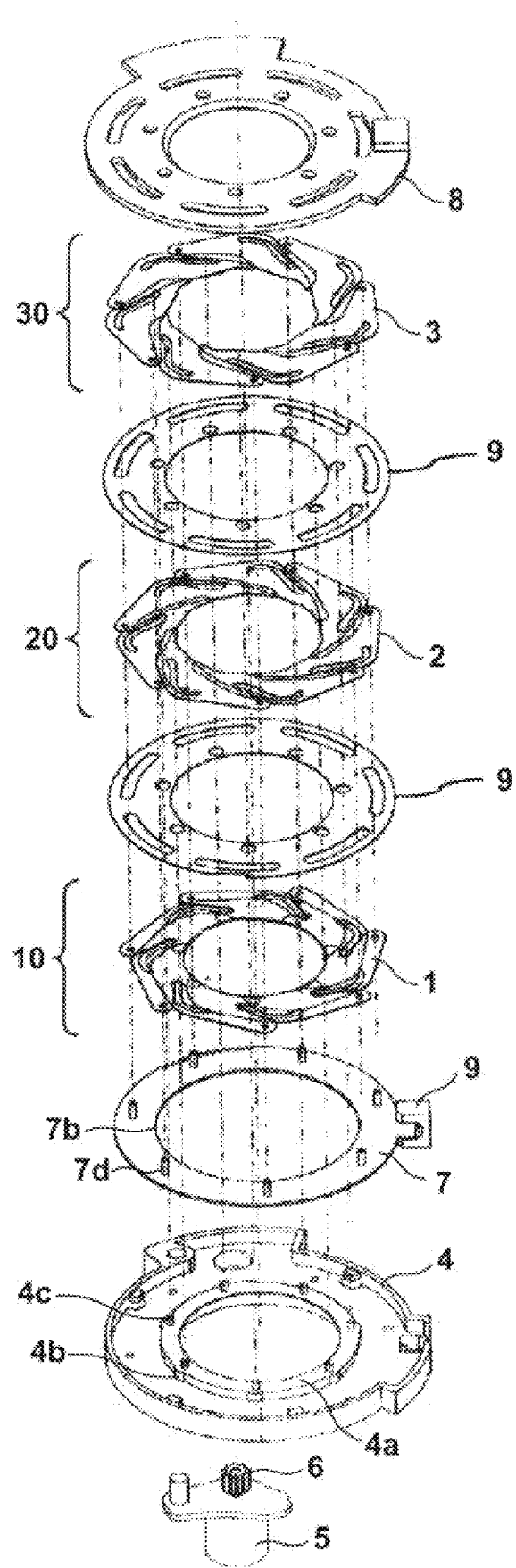

F I G. 14
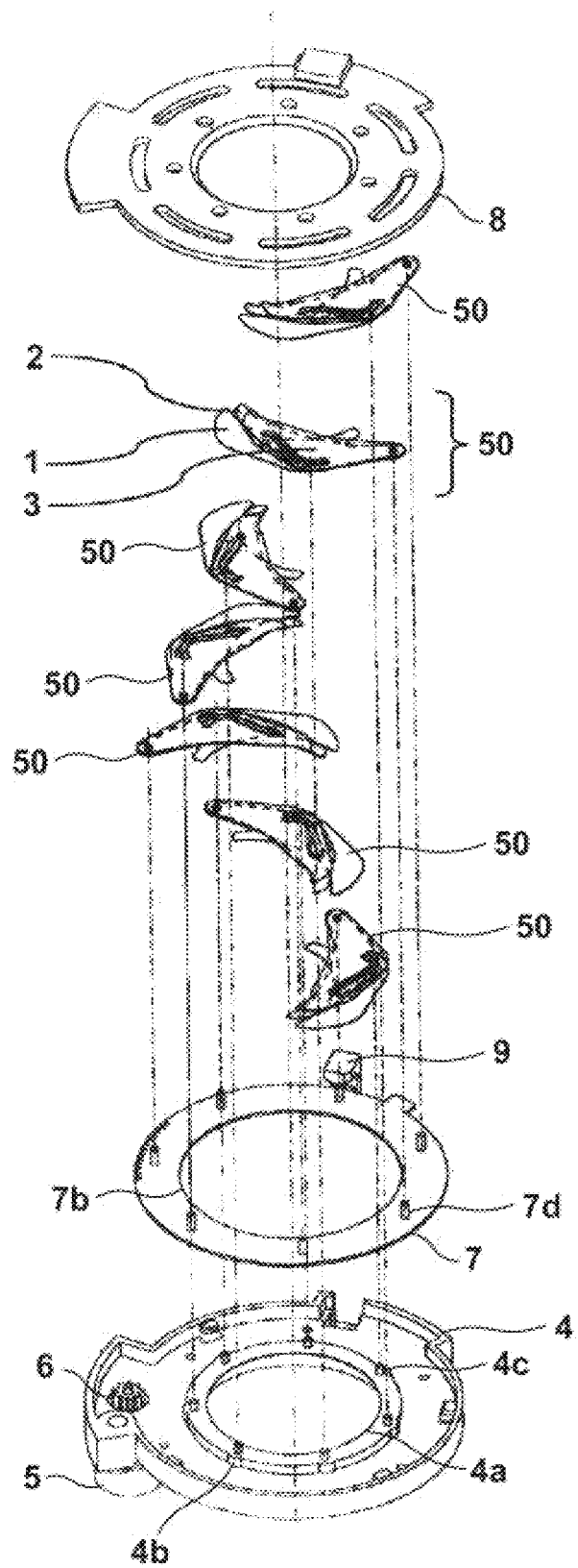

BLADE DRIVING DEVICE AND OPTICAL APPARATUS

This application is a Continuation of International Patent Application No. PCT/JP2016/077553, filed Sep. 16, 2016, which claims the benefit of Japanese Patent Application No. 2015-183228, filed Sep. 16, 2015, both of which are hereby incorporated by reference herein in their entirety.

TECHNICAL FIELD

The present invention relates, for example, to a blade driving device such as a diaphragm device, and an optical apparatus including the blade driving device, such as a camera.

BACKGROUND ART

It is preferable that the shape of an aperture serving as a light passage opening formed in a blade driving device (diaphragm device) is as close to circular as possible. In order to form an aperture having a shape close to a circular shape, three or more multiple diaphragm blades (light amount adjustment blades) are often used. Also, an aperture having a polygonal shape close to a circular shape is formed by pivoting multiple diaphragm blades by a driving ring capable of pivoting around a fixed opening formed in a base member (opening forming member).

Here, Japanese Patent Laid-Open No. 2012-123299 (PTL 1) discloses a diaphragm device that switches a plurality of sets of diaphragm blades such that the aperture shape approximates a circular shape.

However, with the diaphragm device of PTL 1, each of the diaphragm blades needs to be provided with a pivot center dowel and an open-close driving dowel, which is disadvantageous to size reduction.

SUMMARY OF INVENTION

The present invention provides a circular light passage opening from a full-aperture state to a small aperture diameter, and also provides a blade driving device and an optical apparatus that are small in size.

According to an aspect of the present invention, there is provided a blade driving device comprising an opening forming member that forms an opening portion through which light passes; a plurality of groups of blades that are disposed around the opening portion of the opening forming member; and a pivot member that pivots the plurality of groups of blades around the opening portion, wherein, in a process of receiving power from the pivot member to pivot around the opening portion, the plurality of groups of blades form a plurality of circular light passage openings having different diameters by changing a combination of edge portions on the opening portion side of the blades that are linked together in a ring form.

BRIEF DESCRIPTION OF DRAWINGS

FIG. 8B is a diagram showing pressure angles of first, second, and third diaphragm blades of Embodiment 1.

FIG. 8C is a diagram illustrating a pressure angle of the first diaphragm blade of Embodiment 1.

FIG. 8D is a diagram showing pressure angles of the first, second, and third diaphragm blades of Embodiment 1.

FIG. 9A is a diagram showing a circularity of Embodiment 1.

FIG. 13 is an exploded perspective view of a blade driving device according to Embodiment 2 of the present invention.

FIG. 14 is an exploded perspective view of a blade driving device according to Embodiment 3 of the present invention.

DESCRIPTION OF EMBODIMENTS

Hereinafter, embodiments of the present invention will be described in detail with reference to the drawings.

Embodiment 1

Figure 1:
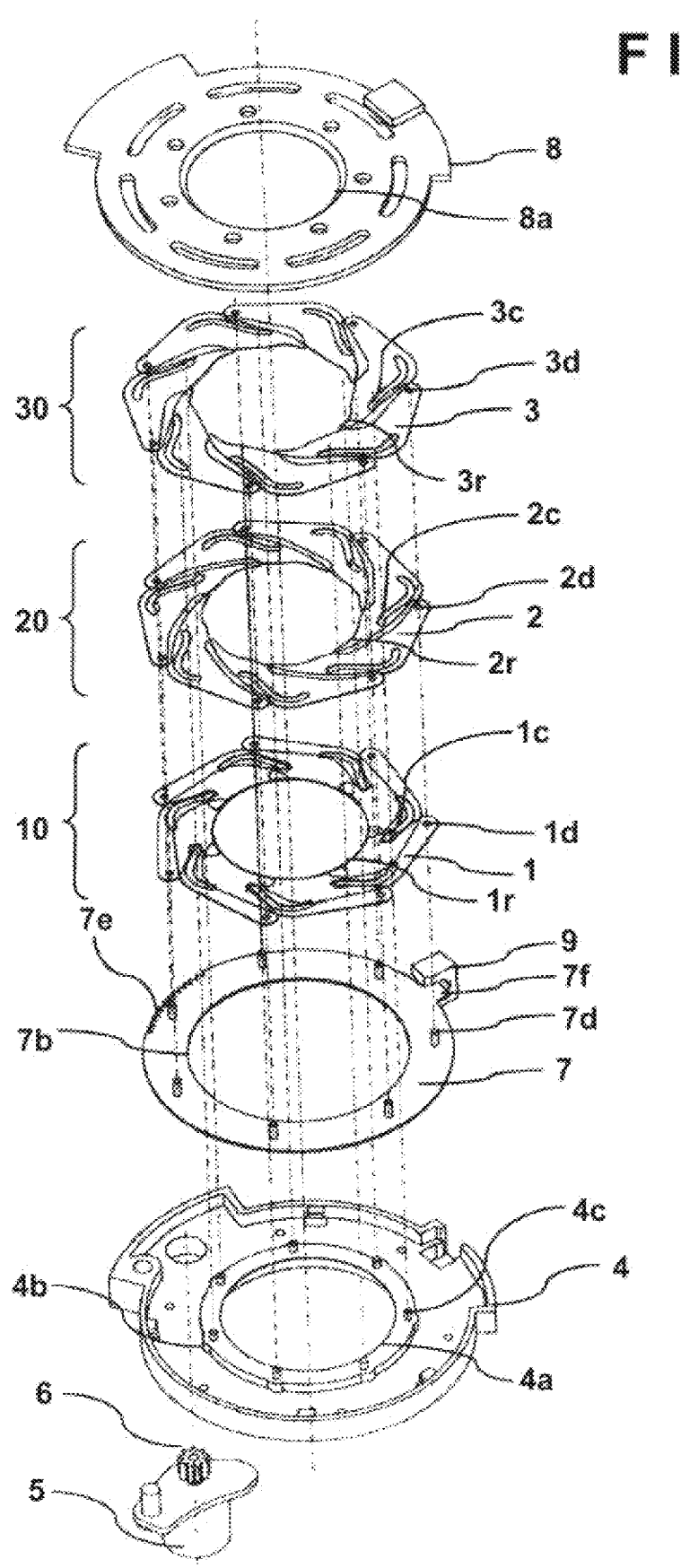
FIG. 1 is an exploded perspective view of a blade driving device according to Embodiment 1 of the present invention.

FIG. 1 shows an exploded perspective view of a blade driving device (diaphragm device) according to Embodiment 1 of the present invention.

In FIG. 1, reference numeral 4 denotes a base member (opening forming member) having an opening portion 4a formed at the center thereof. The base member 4 includes an opening portion 4a that allow passage of light therethrough, an engaging portion 4b, and cam pins 4c.

The base member 4 can be produced by resin molding. A driving portion 5 is attached to the base member 4. As the driving portion 5, a stepping motor, a galvanometer, or the like is used, for example. A pinion 6 is attached to the rotational shaft of the driving portion 5.

Reference numeral 7 denotes a driving ring (opening forming member). The driving ring 7 includes an inner engaging portion 7b, driving pins 7d, a driven portion 7e, and a light-shielding portion 7f. The driving ring 7 can be produced by resin molding. Alternatively, the driving ring 7 can be produced, for example, by pressing a resin film (e.g., a PET sheet material).

The inner engaging portion 7b of the driving ring 7 is engaged with the engaging portion 4b of the base member 4. The engaging portion 4b of the base member 4 may have a circular shape serving as a rotation center. In Embodiment 1, the engaging portion 4b is composed of a plurality of projecting portions, and is engaged with the inner engaging portion 7b of the driving ring 7.

Note that in Embodiment 1, the driving ring 7 and the base member 4 are engaged with each other in a relationship in which the driving ring 7 is located on the outer side and the base member 4 is located on the inner side. However, they may be engaged with each other, with the driving ring 7 located on the inner side and the base member 4 located on the outer side.

In addition, the driving ring 7 includes a gear portion, which is the driven portion 7e. The driven portion 7e is meshed with the pinion 6. The rotational force generated in the driving portion 5 is transmitted from the pinion 6 to the driven portion 7e, and thereby the driving ring 7 is rotated.

Further, the light-shielding portion 7f moves into and out of a slit of a photo interrupter 9. The photo interrupter 9 functions as a sensor for detecting the light-shielding portion 7f, and is used to detect the position of the blade driving device, such as the initial position.

Reference numeral 10 denotes a first diaphragm blade group. Reference numeral 20 denotes a second diaphragm blade group. Reference numeral 30 denotes a third diaphragm blade group. Although the diaphragm blade groups of the present embodiment include three diaphragm groups, namely, the first to third diaphragm blade groups 10, 20, and 30, the diaphragm blade groups may include any number of diaphragm blade groups as long as they include two or more diaphragm blade groups. Further, each of the diaphragm blade groups may include any number of diaphragm blades as long as it is composed of a plurality of diaphragm blades.

The first diaphragm blade group 10 is composed of a plurality of diaphragm blades 1. In Embodiment 1, seven diaphragm blades 1 form the diaphragm blade group 10. An aperture-forming edge portion 1r, an engaging portion (engaging hole) 1d serving as a driven portion, and a cam groove 1c are formed in each diaphragm blade 1.

The second diaphragm blade group 20 is composed of a plurality of diaphragm blades 2. In Embodiment 1, seven diaphragm blades 2 form the diaphragm blade group 20. An aperture-forming edge portion 2r, an engaging portion (engaging hole) 2d serving as a driven portion, and a cam groove 2c are formed each diaphragm blade 2.

The third diaphragm blade group 30 is composed of a plurality of diaphragm blades 3. In Embodiment 1, seven diaphragm blades 3 form the diaphragm blade group 30. An aperture-forming edge portion 3r, an engaging portion (engaging hole) 3d serving as a driven portion, and a cam groove 3c are formed on each diaphragm blade 3.

Although diaphragm blades having the same shape are described as one group in Embodiment 1, a group of diaphragm blades may include diaphragm blades having shapes different from each other.

The diaphragm blade 1, the diaphragm blade 2, and the diaphragm blade 3 can be produced, for example, by pressing a PET sheet material or the like. In addition, it is desirable that the diaphragm blades 1 to 3 are subjected to light-shielding treatment, anti-reflection treatment, abrasion treatment or the like.

Reference numeral 8 denotes a case member. The case member 8 has an opening portion 8a formed therein. The driving ring 7, the plurality of diaphragm blade groups (the first diaphragm blade group 10, the second diaphragm blade group 20, and the third diaphragm blade group 30) are driven in a space formed by the base member 4 and the case member 8.

The engaging hole 1d of a diaphragm blade 1 is engaged with a driving pin 7d of the driving ring 7. The pinion 6 is rotated to apply a force to the driven portion 7e of the driving ring 7, and thereby the driving ring 7 is rotated. When the driving ring 7 is rotated, a driving force is applied from the driving pin 7d of the driving ring 7 to the engaging hole 1d of the diaphragm blade 1, and thereby the diaphragm blade 1 is driven.

The cam groove 1c of the diaphragm blade 1 is engaged with a cam pin 4c of the base member. Accordingly, the cam groove 1c allows the diaphragm blade 1 to move into and out of the opening portion 4a of the base member 4. The aperture-forming edge portions 1r of the first diaphragm blade group 10 composed of a plurality of diaphragm blades 1 form the aperture shape on the opening portion 4a.

The engaging hole 2d of a diaphragm blade 2 is engaged with a driving pin 7d of the driving ring 7. The pinion 6 is rotated to apply a force to the driven portion 7e of the driving ring 7, and thereby the driving ring 7 is rotated. When the driving ring 7 is rotated, a driving force is applied from the driving pin 7d of the driving ring 7 to the engaging hole 2d of the diaphragm blade 2, and thereby the diaphragm blade 2 is driven.

The cam groove 2c of the diaphragm blade 2 is engaged with the cam pin 4c of the base member. Accordingly, the cam groove 2c allows the diaphragm blade 2 to move into and out of the opening portion 4a of the base member 4. The aperture-forming edge portions 2r of the second diaphragm blade group 20 composed of a plurality of diaphragm blades 2 form the aperture shape on the opening portion 4a.

The engaging hole 3d of a diaphragm blade 3 is engaged with a driving pin 7d of the driving ring 7. The pinion 6 is rotated to apply a force to the driven portion 7e of the driving ring 7, and thereby the driving ring 7 is rotated. When the driving ring 7 is rotated, a driving force is applied from the driving pin 7d of the driving ring 7 to the engaging hole 3d of the diaphragm blade 3, and thereby the diaphragm blade 3 is driven.

The cam groove 3c of a diaphragm blade 3 is engaged with a cam pin 3c of the base member. Accordingly, the cam groove 3c allows the diaphragm blade 3 to move into and out of the opening portion 4a of the base member 4. The aperture-forming edge portions 3r of the third diaphragm blade group 30 composed of a plurality of diaphragm blades 3 form the aperture shape on the opening portion 4a.

That is, the plurality of diaphragm blades (the diaphragm blade 1, the diaphragm blade 2, and the diaphragm blade 3) are engaged with the driving pins 7d of the driving ring 7. This is effective for size reduction of the device because the driving pins 7d extend continuously through the plurality of types of blades 1 to 3, and the cam pins 4c extend continuously through the plurality of types of blades 1 to 3.

Further, it is possible to simultaneously drive the plurality of diaphragm blade groups 10, 20, and 30 by one driving portion 5.

Here, all the driving pins 7d extend continuously through the diaphragm blades 1 to 3 of all the blade groups 10 to 30 in the present embodiment. However, the number of blades to be engaged may be decreased as appropriate. For example, only one type of blades may be engaged with a given driving pin 7*d* and a given cam pin 4*c*, and the other types of blades may be engaged with other driving pins 7*d* and other cam pins 4*c*.

For example, the number of each of the driving pins 7*d* and the cam pins 4*c* may be changed to nine, and three each of the driving pins and the cam pins may be assigned to the diaphragm blade group 10, diaphragm blade group 20, the diaphragm blade group 30.

Although the driving portion 5 is used as a driving source in the present embodiment, the driving ring 7 may be manually rotated. Further, the driving force by the pinion 6 and the driving ring 7 is transmitted via a gear in the present embodiment. However, it is possible to attach an arm member including a driving pin to the driving portion 5, provide engaging grooves on the driving ring 7, and engage the driving pins with the engaging grooves, thus transmitting the driving force.

Further, the driving pins 7*d* of the driving ring 7 are located outward of the cam pins 4*c* of the base member 4 in Embodiment 1. Although the driving pins 7*d* of the driving ring 7 are engaged with the engaging holes 1*d* to 3*d* of the diaphragm blades 1 to 3, and the cam grooves 1*c* to 3*c* of the diaphragm blades 1 to 3 are engaged with the cam pins 4*c* of the base member 4, thus rotating the driving ring 7, the relationship between these members may be relatively opposite.

For example, the driving pins 7*d* of the driving ring 7 may be disposed inward and the rotational shaft of the base member 4 may be disposed outward, relative to the circumferential direction. The engaging holes 1*d* to 3*d* of the diaphragm blades 1 to 3 may be engaged with the rotational shaft of the base member 4, and the cam grooves 1*c* to 3*c* of the diaphragm blades 1 to 3 may be engaged with the driving pins 7*d* of the driving ring 7, thus rotating the driving ring 7.

Figure 2:
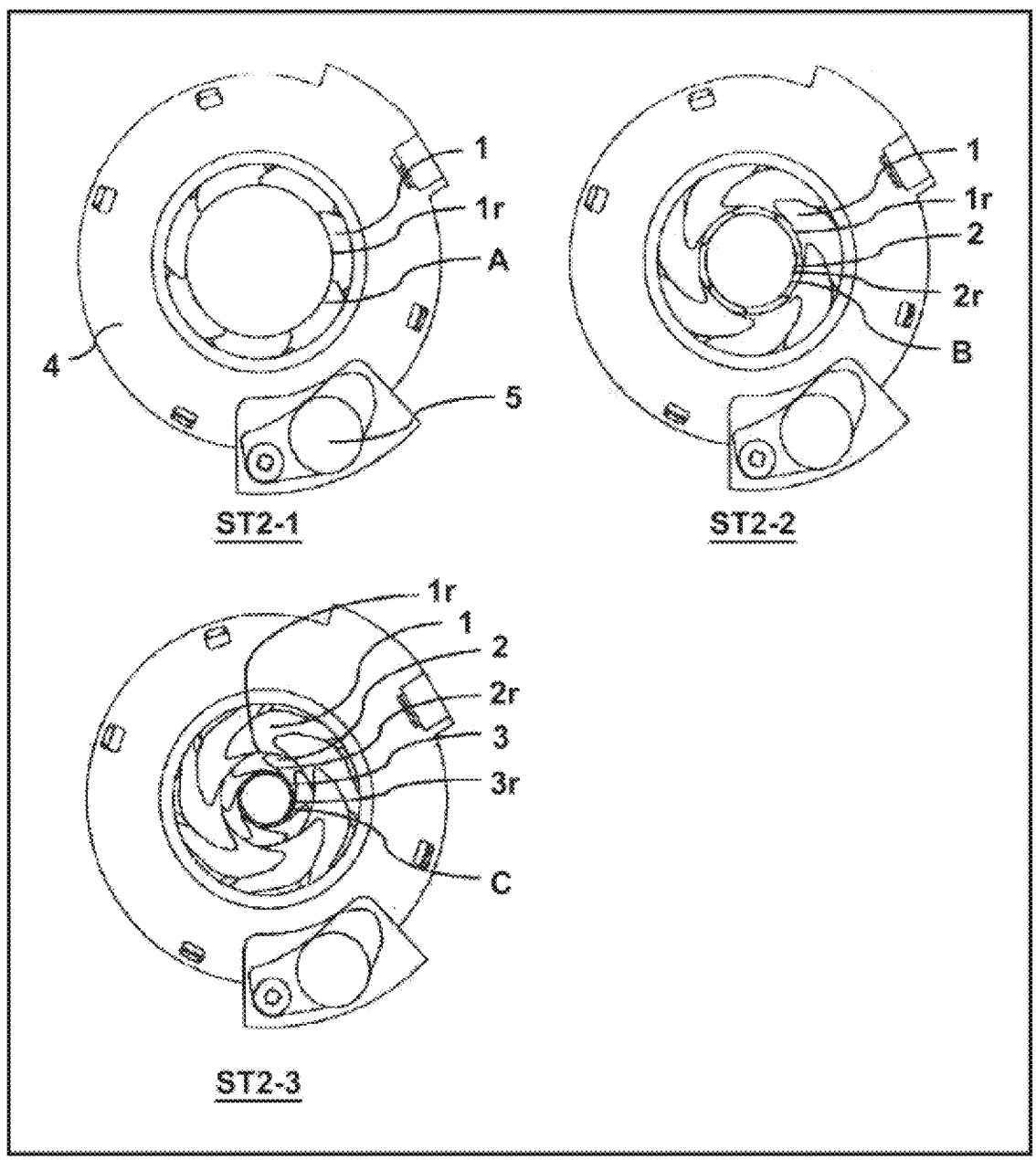
FIG. 2 is a diagram showing a light passage opening of the blade driving device according to Embodiment 1.

FIG. 2 shows states ST2-1 to ST2-3 having different aperture shapes. The state ST2-1 shows a first aperture A. The aperture A is formed by the diaphragm blade group 10. The state ST2-2 shows a second aperture B. The aperture B is formed by the diaphragm blade group 20. The state ST2-3 shows a third aperture C. The aperture C is formed by the diaphragm blade group 30.

The apertures A, B, and C are circular, and the diameters of the apertures may be gradually varied. The diameters of the apertures A, B, and C satisfy the relationship: A>B>C.

Figure 3:
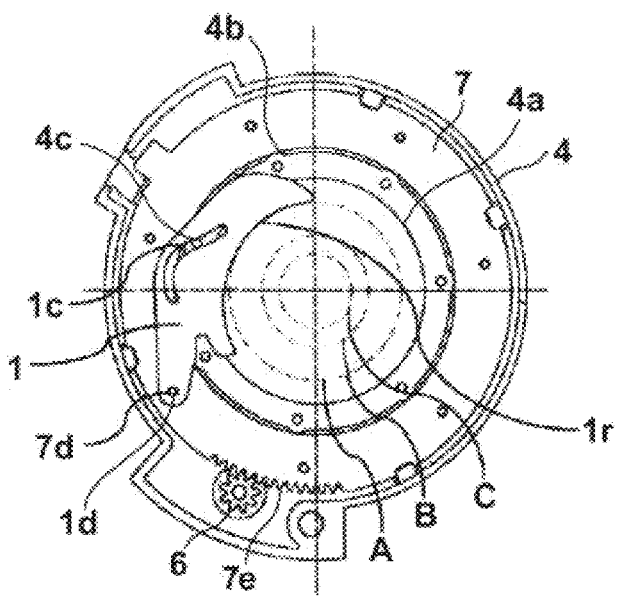
FIG. 3 is a diagram showing a diaphragm blade of a first diaphragm blade group of Embodiment 1.
Figure 4:
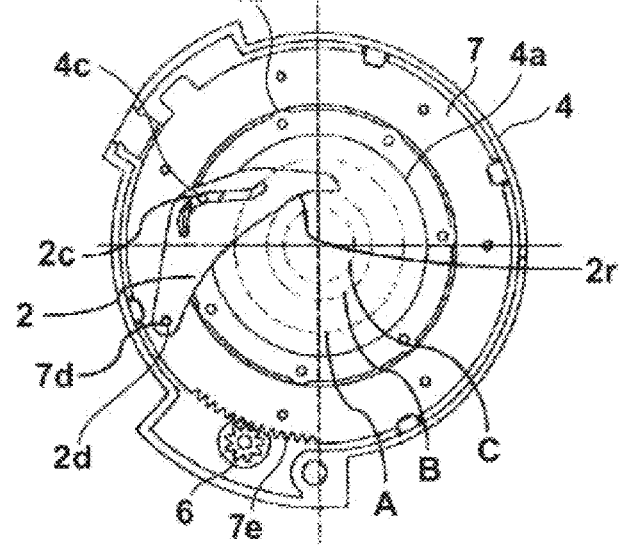
FIG. 4 is a diagram showing a diaphragm blade of a second diaphragm blade group of Embodiment 1.
Figure 5:
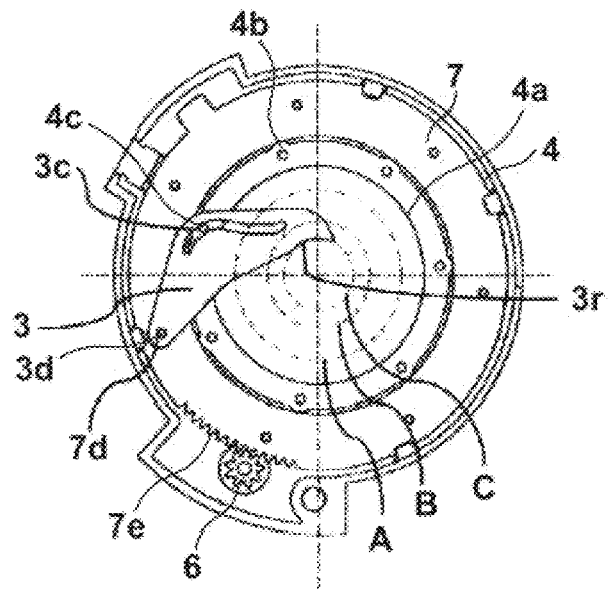
FIG. 5 is a diagram showing a diaphragm blade of a third diaphragm blade group of Embodiment 1.

FIG. 3 is a diagram in which one diaphragm blade 1 is attached to the blade driving device of Embodiment 1. FIG. 4 is a diagram in which one diaphragm blade 2 is attached to the diaphragm device of Embodiment 1. FIG. 5 is a diagram in which one diaphragm blade 3 is attached to the diaphragm device of Embodiment 1.

The aperture A is formed by the diaphragm blade group 10 (the opening forming edge portions 1*r* of the diaphragm blades 1). The aperture B is formed by the diaphragm blade group 20 (the opening forming edge portions 2*r* of the diaphragm blades 2). The aperture C is formed by the diaphragm blade group 30 (the opening forming edge portions 3*r* of the diaphragm blades 3). At this time, the magnitude relationship of the circular arcs R of the opening forming edge portions 1*r* to 3*r* of the diaphragm blades 1 to 3 satisfies 1*r*>2*r*>3*r*.

Figure 6:
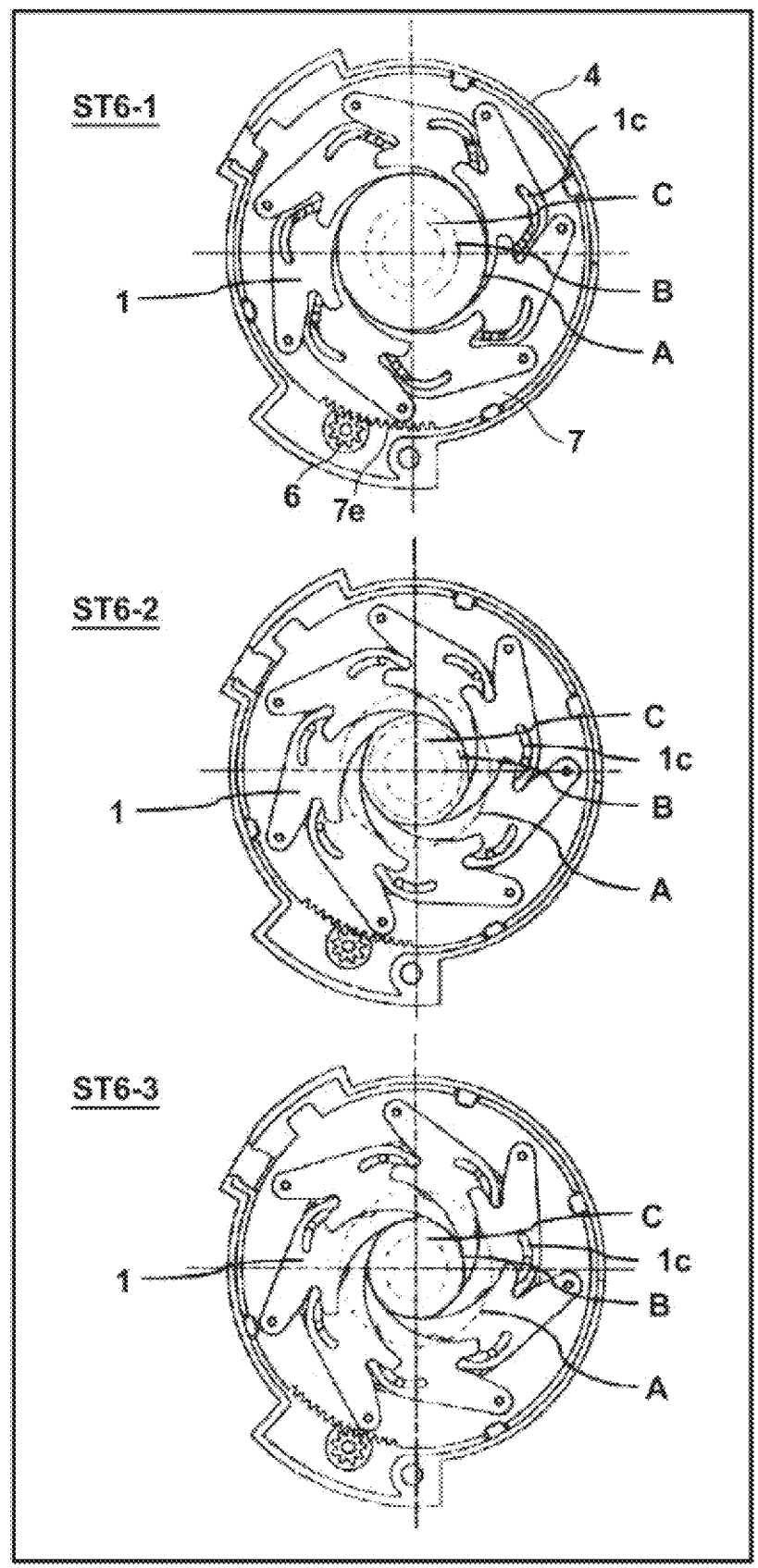
FIG. 6 is a diagram showing the first diaphragm blade group of Embodiment 1.

FIG. 6 is a diagram showing a state in which the diaphragm blade group 10 moves into and out of the opening portion 4*a*. The diaphragm blade group 20 and the diaphragm blade group 30 are not shown. The state ST6-1 is a state of the diaphragm blade group 10 during formation of a perfectly circular aperture A. The state ST6-2 is a state during formation of a perfectly circular aperture B (state in which the diaphragm blade group 10 is at a retracted position). The state ST6-3 is a state during formation of a perfectly circular aperture C (state in which the diaphragm blade group 10 is at the retracted position).

The movement of the diaphragm blades 1 into and out of the opening portion 4*a* is adjusted with the cam grooves 1*c*. The aperture A is formed by the opening forming edge portions 1*r* of the first diaphragm blades 1. Since the aperture B and the aperture C are formed by the other diaphragm blade groups 20 and 30, the diaphragm blade group 10 stays at a position retracted from the contour of the aperture B or C.

Figure 7:
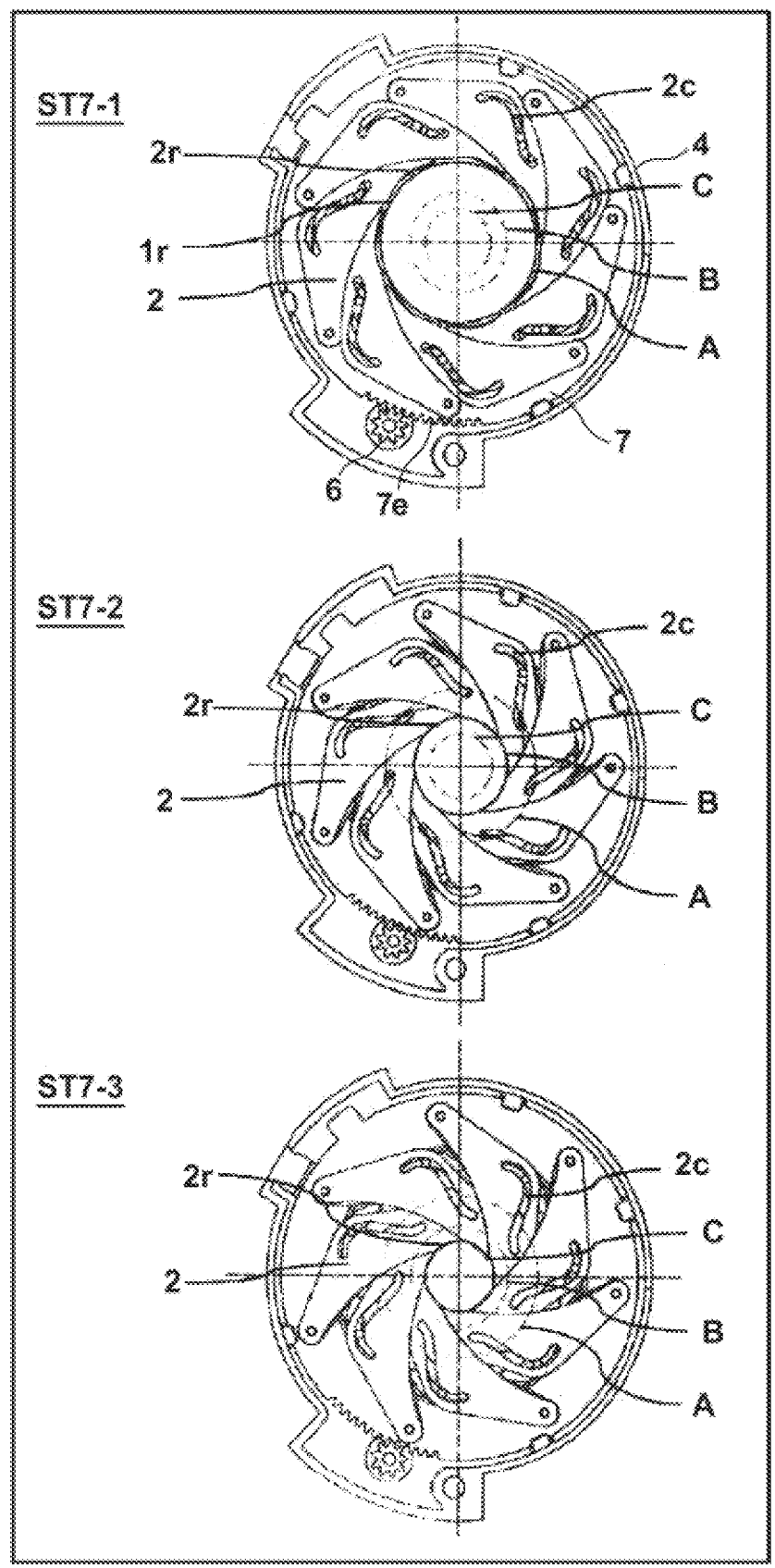
FIG. 7 is a diagram showing the first and second diaphragm blade groups of Embodiment 1.

FIG. 7 is a diagram showing a state in which the diaphragm blade group 20 moves into and out of the opening portion 4*a*. The diaphragm blade group 30 is not shown. The diaphragm blade group 20 is shown as being disposed so as to overlap the diaphragm blade group 10. The state ST7-1 is a state during formation of a perfectly circular aperture A, and the diaphragm blade group 20 is at a retracted position. The state ST7-2 is a state of the diaphragm blade group 20 during formation of a perfectly circular aperture B. The state ST7-3 is a state during formation of a perfectly circular aperture C, and the diaphragm blade group 20 is in the retracted state.

The movement of the diaphragm blades 2 into and out of the opening portion 4*a* is adjusted by the cam grooves 2*c*. The aperture A is formed by the diaphragm blade group 10. The diaphragm blade group 20 stays at a position retracted from the contour of the aperture A, and is not involved in the formation of the aperture A. The aperture B is formed by the opening forming edge portions 2*r* of the diaphragm blades 2. Since the aperture C is formed by the other diaphragm blade group 30, the diaphragm blade group 20 stays at a position retracted from the aperture C.

Figure 8:
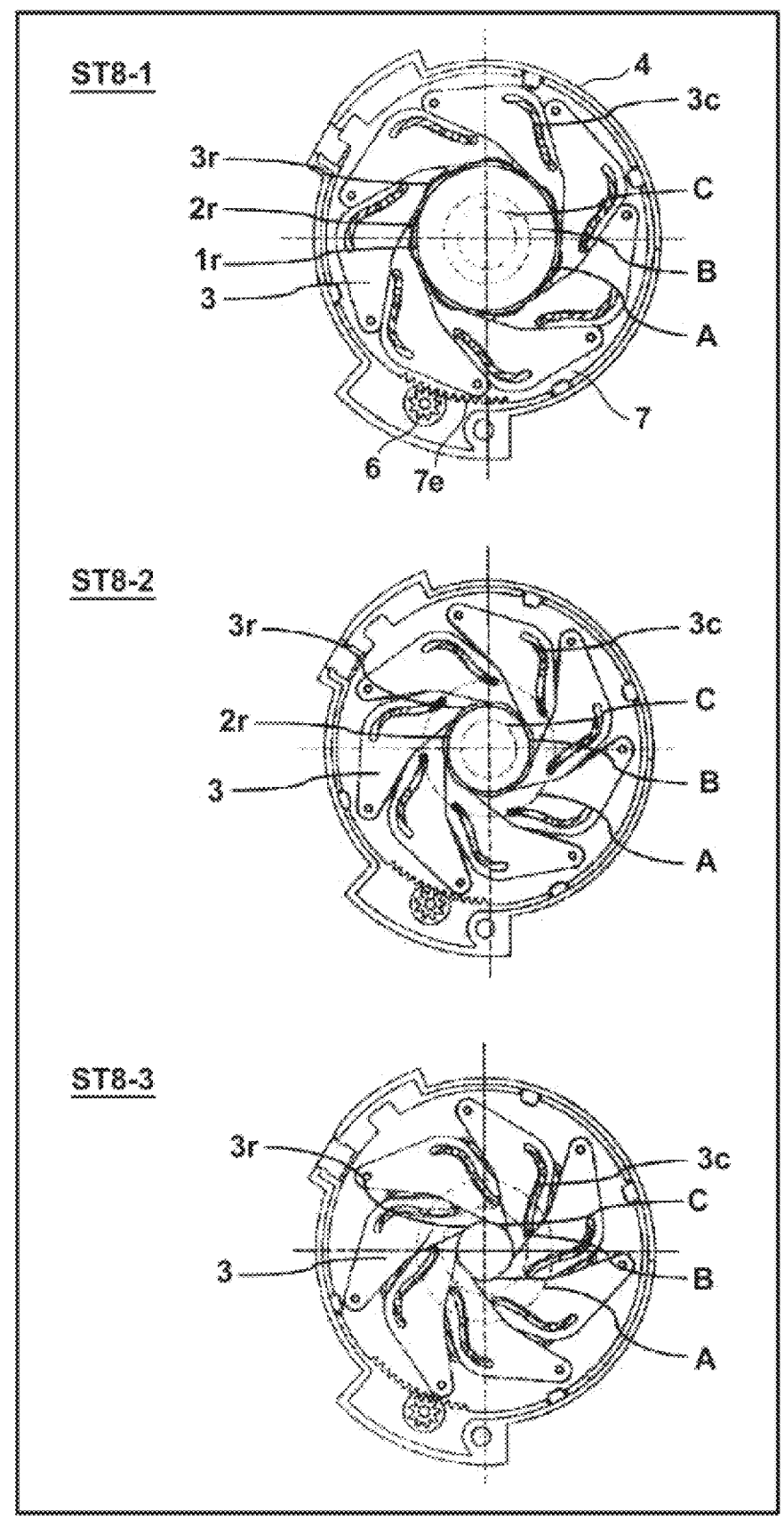
FIG. 8 is a diagram showing the first, second, and third diaphragm blade groups of Embodiment 1.

FIG. 8 is a diagram showing a state in which the diaphragm blade group 30 moves into and out of the opening portion 4*a*. The diaphragm blade group 20 and the diaphragm blade group 30 are shown as being disposed so as to overlap the diaphragm blade group 10. A state ST8-1 is a state during formation of a perfectly circular aperture A, and the diaphragm blade group 20 and the diaphragm blade group 30 are at the retracted positions. A state ST8-2 is a state during formation of a perfectly circular aperture B, and the diaphragm blade group 30 is at the retracted position. A state ST8-3 is a state of the diaphragm blade group 30 during formation of a perfectly circular aperture C.

The movement of the diaphragm blades 3 into and out of the opening portion 4*a* is adjusted with the cam grooves 3*c*. The aperture A is formed by the diaphragm blade group 10. The diaphragm blade group 30 stays at a position retracted from the contour of the aperture A, and is not involved in the formation of the aperture A.

The aperture B is formed by the diaphragm blade group 20. The diaphragm blade group 30 stays at a position retracted from the contour of the aperture B, and is not involved in the formation of the aperture B. The aperture C is formed by the opening forming edge portions 3*r* of the diaphragm blade 3.

That is, the blade driving device of Embodiment 1 includes a plurality of blade groups 10 to 30 that are rotatably disposed in a ring form around the opening portion 4*a* of the base member (opening forming member) 4. By changing the combination of the edge portions 1*r* to 3*r* of the blades 1 to 3 on the opening portion side that are linked together in a ring form, the plurality of blade groups 10 to 30 can form a plurality of circular light passage openings having different diameters.

Figure 8A:
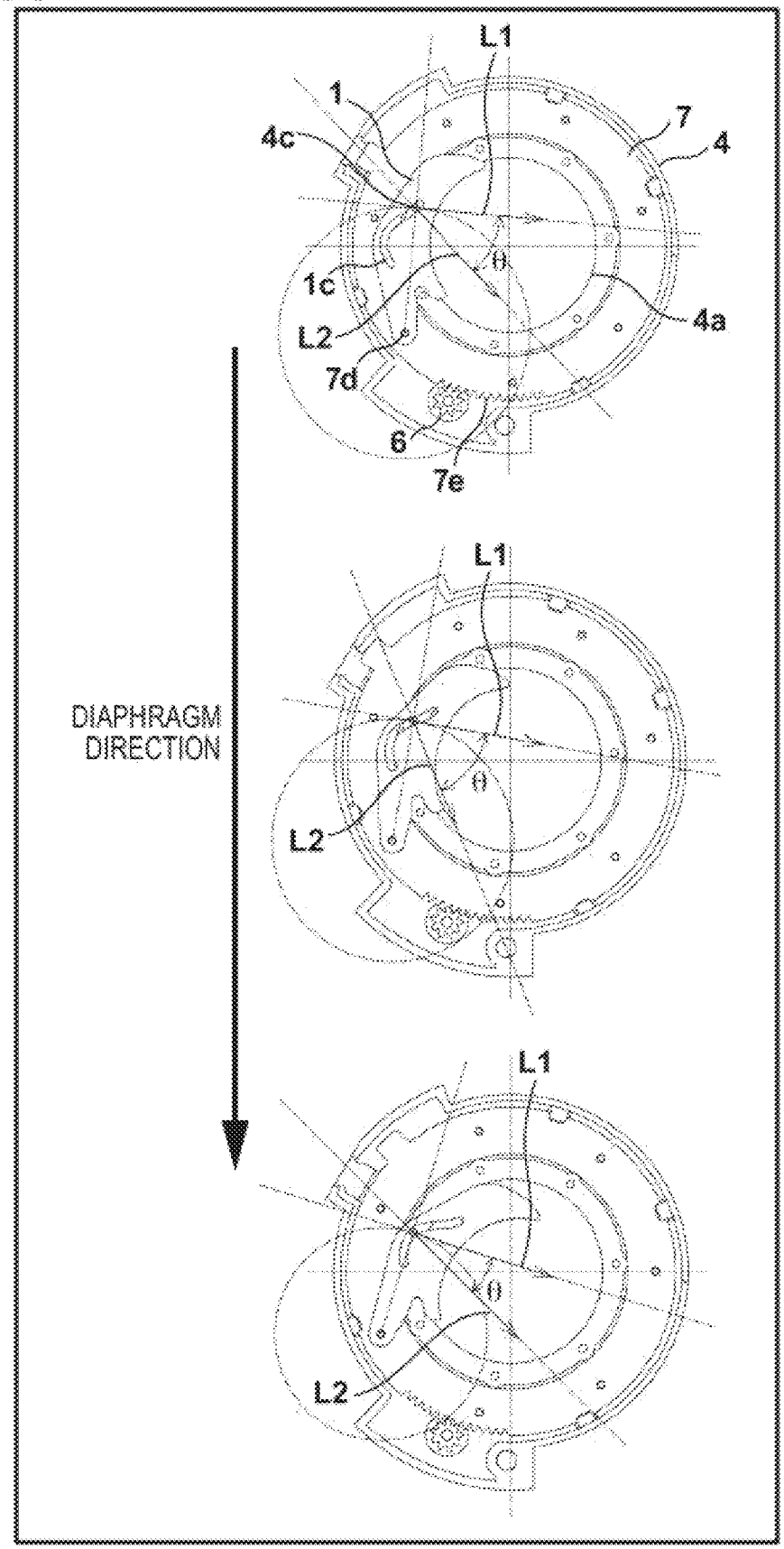
FIG. 8A is a diagram illustrating a pressure angle of a first diaphragm blade of Embodiment 1.

Here, the pressure angles of the diaphragm blade 1, the diaphragm blade 2, and the diaphragm blade 3 will be described in detail. FIG. 8A shows a pressure angle θ of the diaphragm blade 1. Since the same description applies to the diaphragm blades 2 and 3, the diaphragm blade 1 will be described as a representative example. The pressure angle θ refers to an angle between a line L1 and a line L2. The line L1 is a line facing in the rotational direction of the diaphragm blade 1 and passing through the cam pin 4c. In other words, the line L1 is a line orthogonal to a line passing through the cam pin 4c and the driving pin 7d. The line L2 is a normal of the cam groove 1c at a point of contact between the cam pin 4c and the cam groove 1c.

The larger the pressure angle θ, the larger the force required to rotate the diaphragm blade 1 is. The pressure angle θ of each of the diaphragm blades 1 to 3 changes in the process of changing from a full-aperture to a small aperture. FIG. 8B shows a graph of the changes in the respective pressure angles θ of the diaphragm blade 1, the diaphragm blade 2, and the diaphragm blade 3. In the present embodiment, the respective pressure angles θ of the diaphragm blades 1 to 3 are configured to reach their peaks at different points. Reference numerals P1 to P3 indicate the peak positions of the pressure angles θ of the diaphragm blades 1 to 3. By dispersing the positions at which the pressure angles θ reach their peaks, it is possible to reduce the maximum voltage value required to drive the blade driving device.

FIG. 8C shows the changes in position of the first diaphragm blade group 10 from a full aperture to a minimum aperture. As can be seen from the graph of FIG. 8B, the pressure angle of the first diaphragm blade group 10 gradually increases from the full-aperture state, and reaches its peak at P1, at which the load on the blade driving device is maximum (state 1-1 shown in FIG. 8C). Thereafter, the pressure angle decreases so as to lower gradually. Then, when the first diaphragm blade group 10 is pivoted by rotation of the driving ring 7 to a state 1-2 as shown in FIG. 8C, the pressure angle of the first diaphragm blade group 10 becomes comparable to that immediately after being driven from a full aperture. On the other hand, the second diaphragm blade group 20 that receives a load from the driving ring 7 is configured such that the pressure angle thereof gradually increases from the full-aperture state, and the pressure angle becomes maximum upon reaching a state 2-2 shown in FIG. 8C. As indicated by P2 in FIG. 8B, the pressure angle that has reached its peak gradually decreases by the subsequent driving by the driving ring 7. Similarly, the third diaphragm blade group 30 receives a load from the driving ring 7, and is configured such that the pressure angle gradually increases from the full-aperture state. The pressure angle becomes maximum upon reaching a state 3-3 shown in FIG. 8C. Here, it is preferable that the pressure angle is configured such that a point at which the pressure angle is reduced locally appears (local maximum appears) in order to prevent interference between the other diaphragm blade groups or between the cam grooves through which the driving pins 7d driving the blade groups pass.

FIG. 8D shows the structures and the blade pivot directions of the cam grooves 1c to 3c of the first diaphragm blade 1, the second diaphragm blade 2, and the third diaphragm blade 3 in this order from the left. The driving load increases with an increase in the pressure angle, which is an angle formed between each of the arrows indicating the pivot directions of the blades and the direction of the normal of the inner wall of the corresponding one of the cam grooves 1c to 3c at the positions of abutment between the cam pin 4c and the inner wall of the cam groove at the arrow positions.

For the cam pin 4c passing through the inside of the cam grooves 1c to 3c of the first, second, and third diaphragm blades 1 to 3, the positions of the cam pins 4c that correspond to P1 to P3 in FIG. 8B are indicated as a first position 4c1, a second position 4c2, and a third position 4c3, respectively.

As described above, the pressure angle in the present embodiment is configured such that maximum pressure angles of the diaphragm blade groups appear in the order of the first, second, and third diaphragm blade groups. To describe specifically, assuming that the distal end side of the cam groove formed on each diaphragm blade is an origin (full aperture), as the driving ring 7 is gradually rotated, the cam pin 4c moves while extending through all the first, second, and third diaphragm blades with the driving pins 7d formed on the driving ring 7 serving as the pivot center. Each diaphragm blade is pivoted while the positions and the directions of abutment between the cam pin 4c and the cam grooves 1c to 3c are consequently changed according to the shape of the cam groove formed on each of the diaphragm blades.

The first diaphragm blade has a cam groove shape that gives a maximum pressure angle on the side of a first portion side is closer to the origin than the second and third diaphragm blades, and, therefore, a maximum value of the driving load exerted by the first diaphragm blade appears on the first portion side. Then, the second diaphragm blade has a cam groove that gives a maximum pressure angle at a second portion located at the vicinity of the middle of the cam groove shape, and, therefore, a maximum value of the driving load exerted by the second diaphragm blade appears at the second portion. The third diaphragm blade has a cam groove shape that gives a maximum pressure angle at a third portion of the cam groove that is closest to the engaging hole 3d, and, therefore, a maximum value of the driving load exerted by the third diaphragm blade appears at the third portion.

That is, as compared with a blade driving device having the same total number of diaphragm blades and composed of diaphragm blades having the same shape, the present embodiment enables the device to be driven with less power because the peaks of the pressure angles can be dispersed. In the present embodiment, in the process of changing from a full aperture to a small aperture, the peaks of the pressure angles θ appear in the order of the diaphragm blade 1, the diaphragm blade 2, and the diaphragm blade 3. However, a different order can be adopted.

Figure 9:
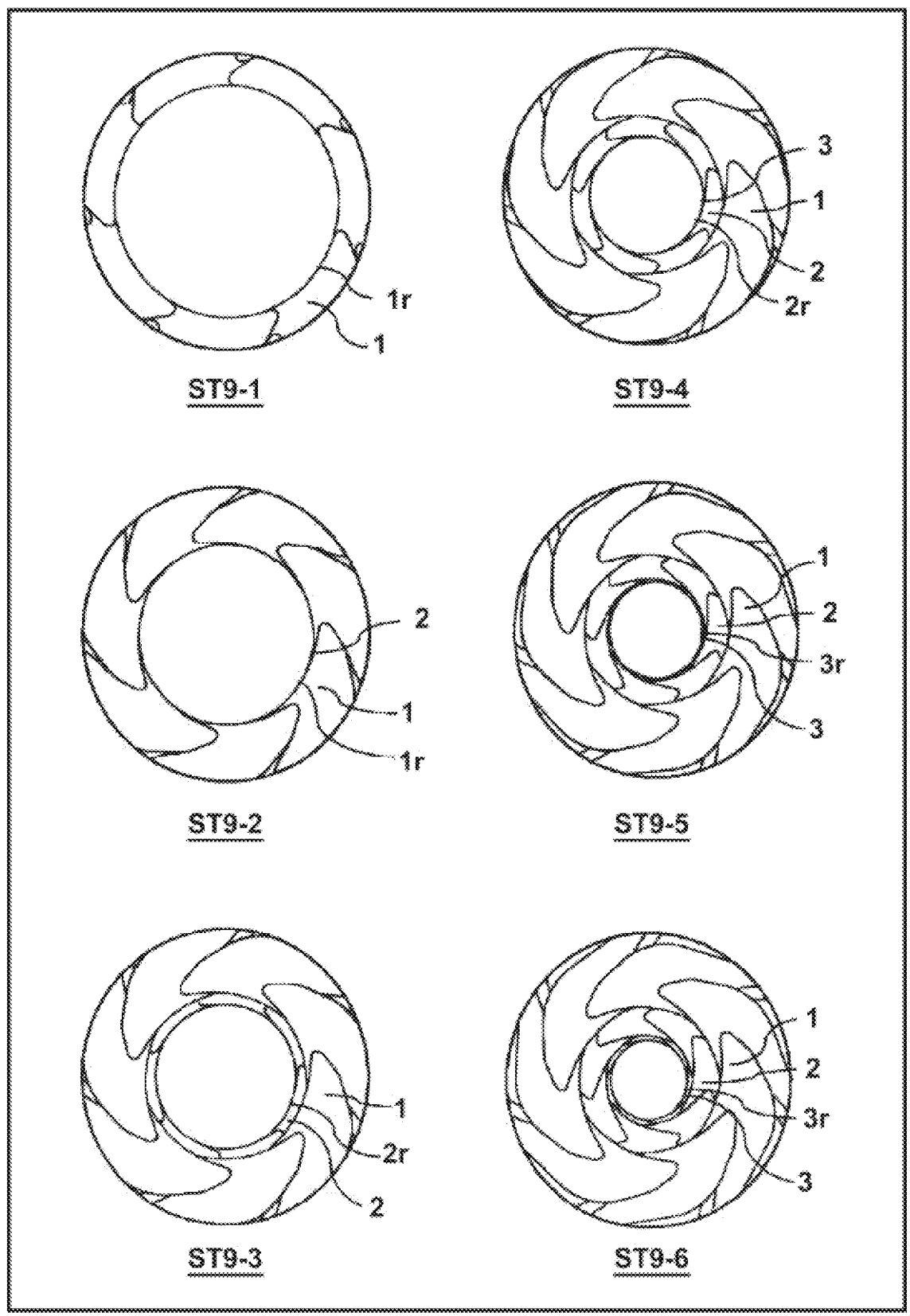
FIG. 9 is a diagram showing a light passage opening of Embodiment 1.

FIG. 9 is a diagram in which the changes in aperture of Embodiment 1 is shown successively. A state ST9-1 is a state in which a perfectly circular aperture A is formed by the diaphragm blade group 10. A state ST9-2 is a state in the middle of changing from the aperture A to an aperture B, with the aperture being formed by the diaphragm blade group 10 and the diaphragm blade group 20.

By forming the cam groove 2c such that an intersection portion at which the diaphragm blades 1 overlap each other is corrected by the diaphragm blades 2, it is possible to obtain an aperture having a shape as close as possible to a perfect circle.

A state ST9-3 is a state in which a perfectly circular aperture B is formed by the diaphragm blade group 20. A state ST9-4 is a state in the middle of changing from the aperture B to an aperture C, with the aperture being formed by the diaphragm blade group 20 and the diaphragm blade group 30.

By forming the cam groove 3c such that an intersection portion at which the diaphragm blades 2 overlap each other is corrected by the diaphragm blades 3, it is possible to obtain an aperture having a shape as close as possible to a perfect circle. That is, in the process of changing between circular light passage openings formed by the blade groups 10 to 30, an intermediate opening can be formed before and after the change by combining the blades forming the circular light passage openings. For example, in the state ST9-2, the diaphragm blade 1 and the diaphragm blade 2 are compositely combined (linked together), thus forming a circular light passage opening that is smaller than the circular light passage opening before the change and is larger than the circular light passage opening after the change. This allows the aperture to be maintained in a shape very close to a circular shape over the entire aperture range (diaphragm process).

A state ST9-5 is a state in which a perfectly circular aperture C is formed by the diaphragm blade group 30. A state ST9-6 is also a state in which an aperture having a smaller diameter is formed by the diaphragm blade group 30.

The aperture diameter can be successively changed from the full-aperture state in the order of: aperture A=>diaphragm aperture having an intermediate diameter between the aperture A and the aperture B=>aperture B=>aperture having an intermediate diameter between the aperture B and the aperture C=>aperture C=>aperture having a smaller diameter than that of the aperture C. These are merely representative aperture positions, and there are aperture shapes other than these. However, an aperture having an extremely polygonal shape will not be formed because an aperture is formed by another diaphragm blade group before being changed from a circular shape to a polygonal shape, unlike the conventional technique. Further, the member determining a reference opening of a blade driving device may be either the opening portion 4a of the base member 4 or the opening portion 8a of the case member 8. Alternatively, an aperture formed by the diaphragm blade group 10 may be used as a reference aperture.

Figure 9B:
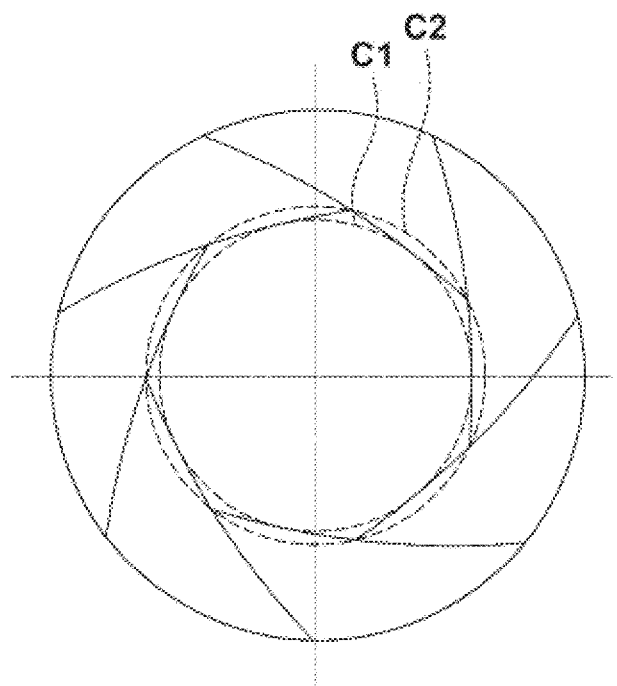
FIG. 9B is a diagram showing a circularity of Embodiment 1.

FIG. 9A shows a graph of circularity. Here, a circularity is defined as follows: Circularity=(Diameter of inscribed circle of aperture shape)$^2$/(Diameter of circumscribed circle of aperture shape)$^2$. In FIG. 9B, C1 indicates the inscribed circle of the aperture shape, and C2 indicates the circumscribed circle of the aperture shape. When the opening shape is perfectly circular, the circularity is 1. As the opening shape becomes closer to a polygonal shape, the value moves away from 1 in the decreasing direction. In general, the circularity of a conventional blade driving device (for example, a diaphragm device that simultaneously operates a plurality of blades of a single type by a driving ring) gradually deteriorates in the process of changing a full-aperture to a minimum aperture (see the properties of "CIRCULARITY: CONVENTIONAL PRODUCT" shown in FIG. 9A). In contrast, the circularity of the embodiment ("CIRCULARITY: EMBODIMENT 1" in FIG. 9A) does not continue to deteriorate in the process of changing from a full aperture to a minimum aperture, and is improved in the middle stage of the process. In Embodiment 1, the circularity is improved according to the number of diaphragm blade groups. In Embodiment 1, each of the diaphragm blade groups forms a perfect circle, and, therefore, the circularity can be improved three times, to a value of 1 in the process of changing from a full aperture to a minimum aperture.

Here, the positions at which the circularity is improved to 1 are set such that F values at the positions at which the diaphragm blade groups form a perfect circle appear at about the same intervals. Specifically, in the present embodiment, there are four locations at which the circularity becomes 1 as a light passage opening is narrowed: The F value at the opening portion 4a (reference opening) of the base member 4 is 2.0, the F value at the position at which the next first diaphragm blade group 10 forms a perfect circle is 2.8, the F value at the position at which the next second diaphragm blade group 20 forms a perfect circle is 4.2, and the F value at the position at which the next third diaphragm blade group 30 forms a perfect circle is about 5.6. This means that the light amount is decreased by half at each of the positions at which a perfectly circular light passage opening is formed, relative to the light passage opening area at the opening portion 4a of the base member 4. In other words, the diameter at a perfectly circular light passage opening is decreased by approximately $\sqrt{2}$ times from the diameter of the opening portion 4a of the base member 4 is. Note, however, that these are set not as precise numerical values, but as approximate values, taking into consideration catching with other cam grooves, for example.

Here, it is also possible to further stabilize the circularity over the entire aperture region, from a full aperture to a minimum aperture. In Embodiment 1, the circularity is adjusted to 1 three times in the process of changing from a full aperture to a minimum aperture. It is also possible to reduce the rate of change in circularity (see the properties of "CIRCULARITY: ENTIRE RANGE ADJUSTED" in FIG. 9A) by not adjusting the circularity to 1 in the process of changing from a full aperture to a minimum aperture (not forming a perfect circle during the changing process). Furthermore, as can be seen from the graph of FIG. 9A, the deterioration in circularity with a minimum aperture can be suppressed to a minimum. This can be achieved by combining a plurality of curvature shapes, rather than using a single curvature for each of the opening forming edge portions 1r, 2r, and 3r that form the diaphragm blade 1, the diaphragm blade 2, and the diaphragm blade 3. In addition, each of the opening forming edge portions 1r, 2r, and 3r of the diaphragm blades may be formed not only by a combination of curved line shapes, but also a combination of straight line shapes, or a combination with a spline-curved line or the like. It is desirable that the circularity is 1. However, practically, a human eye sees a shape as a circle if it has a circularity of 0.95 or more. With Embodiment 1, it is possible to suppress the circularity within the range of 0.95 to 1 in a wide range of aperture diameter states. Accordingly, the aperture shape in a wide range or over the entire region can be substantially maintained in a circle.

Note that as shown in the state ST9-3 in FIG. 9, during the formation of an aperture by the diaphragm blade group 20, the diaphragm blade group 10 is caused to remain inside the opening portion 4a of the base member 4, and thereby the warp of the diaphragm blade group 20 that forms an aperture on the inner side thereof can be suppressed by the diaphragm blade group 10. Accordingly, it is possible to reduce the amount of warp, thus making it possible to reduce the thickness of the device. Similarly, as shown in the state ST9-5 in FIG. 9, it is possible to reduce the thickness of the device by suppressing the warp of the diaphragm blade group 30 by the diaphragm blade group 20.

Figure 10:
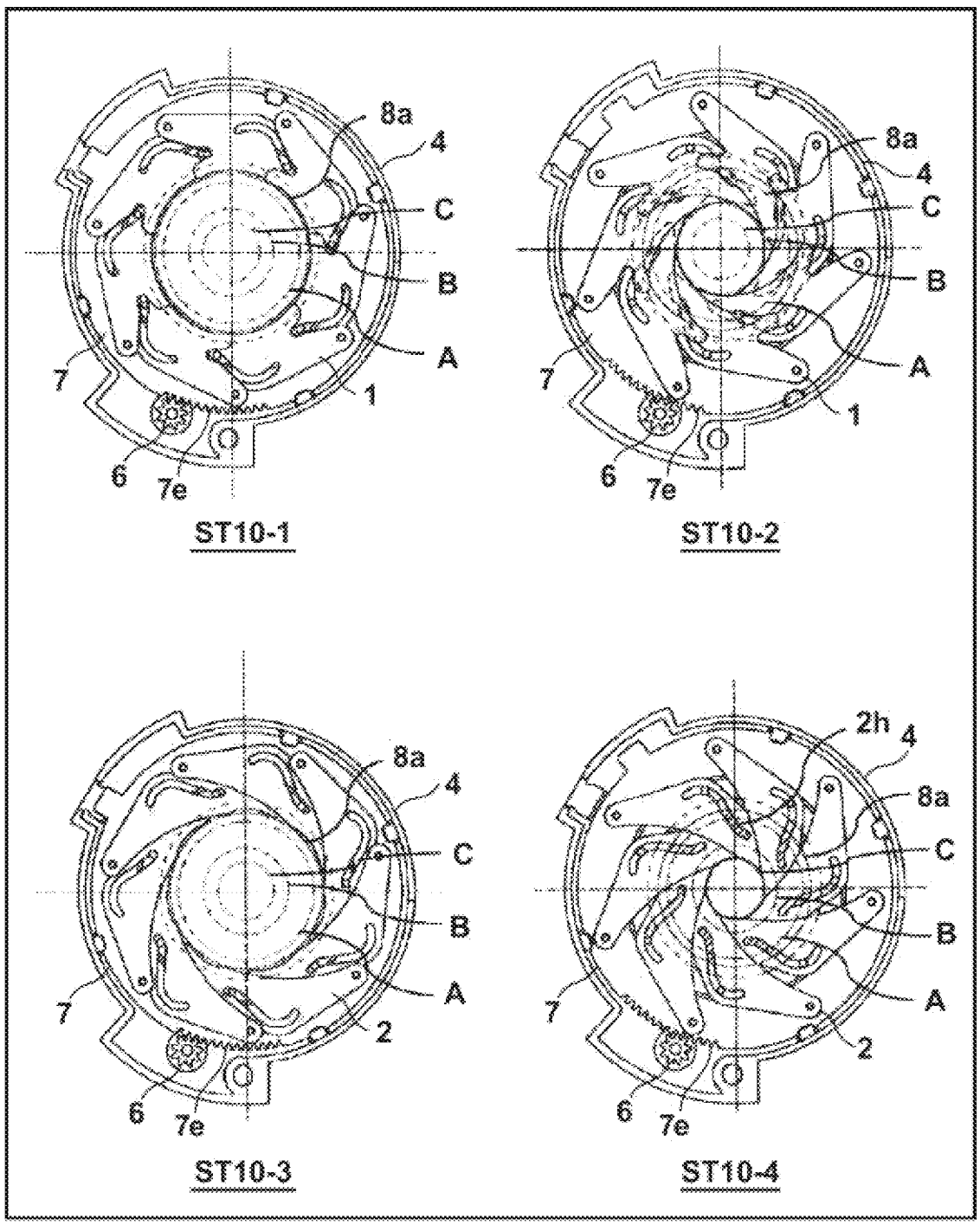
FIG. 10 is a diagram showing the diaphragm blade groups of Embodiment 1.

A state ST10-1 in FIG. 10 is a full-aperture state. Only the first diaphragm blade group 10 is shown (the second and third diaphragm blade groups 20 and 30 are not shown). A state ST10-2 in FIG. 10 is a small-aperture state. The diagram only shows the first diaphragm blade group 10 (the second and third diaphragm blade groups 20 and 30 are not shown). A state ST10-3 in FIG. 10 is a full-aperture state. Only the second diaphragm blade group 20 is shown (the first and third diaphragm blade groups 10 and 30 are not shown). A state ST10-4 in FIG. 10 shows a small-aperture state. Only the second diaphragm blade group 20 is shown (the first and third diaphragm blade groups 10 and 30 are not shown).

Figure 11:
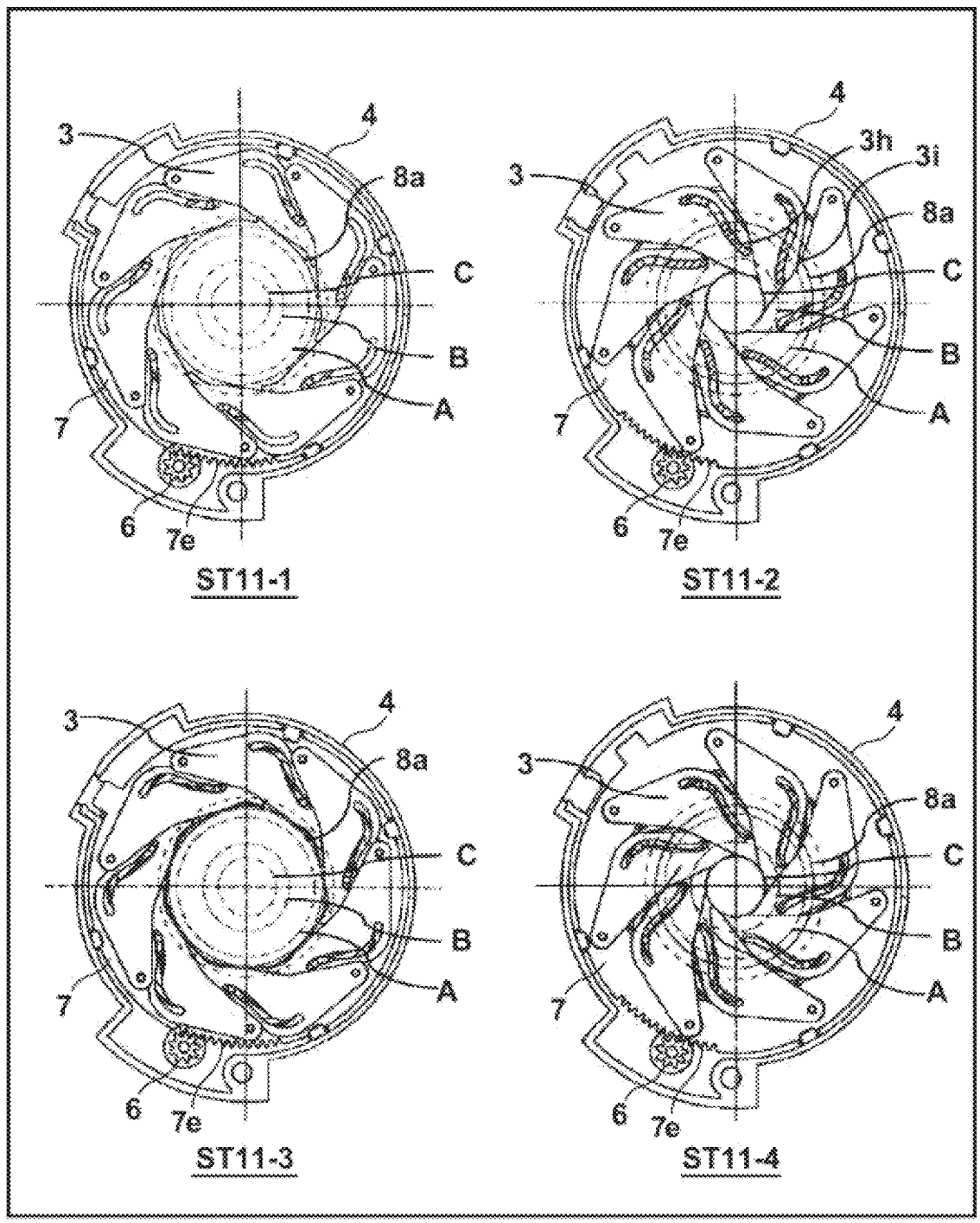
FIG. 11 is a diagram showing the diaphragm blade groups of Embodiment 1.

A state ST11-1 in FIG. 11 is a full-aperture state. Only the third diaphragm blade group 30 is shown (the first and second diaphragm blade groups 10 and 20 are not shown). A state ST11-2 in FIG. 11 is a small aperture. Only the third diaphragm blade group 30 is shown (the first and second diaphragm blade groups 10 and 20 are not shown). A state ST11-3 in FIG. 11 is a full-aperture state. Although the first, second, and third diaphragm blade groups 10 to 30 are shown, the first and second diaphragm blade groups 10 and 20 are concealed behind the third diaphragm blade group 30. A state ST11-4 in FIG. 11 is a small-aperture state. Although the first, second, and third diaphragm blade groups 10 to 30 are shown, the first and second diaphragm blade groups 10 and 20 are concealed behind the third diaphragm blade group 30.

In the drawings, lines indicating the opening portion 8a are shown for reference. The plurality of diaphragm blade groups 10, 20, and 30 move into and out of the opening portion 8a, thus forming an aperture. In the case of forming an aperture by using only the second diaphragm blade group 20, the diaphragm blades 2 each have a hole in the cam groove 2c, so that light amount leaking portions 2h are produced as shown in the state ST10-4 in FIG. 10.

In the case of forming an aperture by using only the third diaphragm blade group 30, the diaphragm blades 3 each have a hole in the cam groove 3c, so that light amount leaking portions 3h are produced as shown in the state ST11-2 in FIG. 11. In the case of forming an aperture by using one diaphragm blade group, the diaphragm blade group needs to be disposed at a position at which the cam grooves 1c to 3c of the diaphragm blades do not enter inside the opening portion 8a in order to prevent such light amounts, and it is therefore necessary to increase the outside shape size.

In addition, the cam grooves need to be disposed at positions at which the cam grooves can be closed by adjacent diaphragm blades included in one diaphragm blade group, so that it is necessary to increase the outside shape size.

In Embodiment 1, the light amount leaking portions 2h and 3h can be closed by other diaphragm blade groups. As shown in the state ST10-2 in FIG. 10, the first diaphragm blade group 10 provides light shielding between the opening portion 8a of the case member 8 and the aperture B. The light amount leaking portions 2h of the second diaphragm blade group 20 shown in the state ST10-4 in FIG. 10 are produced between the opening portion 8a and the aperture B.

The light amount leaking portions 3h of the third diaphragm blade group 30 shown in the state ST11-2 in FIG. 11 are produced between the opening portion 8a and the aperture B. When the first diaphragm blade group 10, the second diaphragm blade group 20, and the third diaphragm blade group 30 are combined, light shielding can be provided for the light amount leaking portions 2h and 3h by the first diaphragm blade group 10 as shown in the state ST11-4 in FIG. 11.

Thus far, a method of closing the light amount leaking portions of the cam groove holes of the diaphragm blades has been described. However, light shielding for light amount leaking portions 3i produced by the outside shape of the diaphragm blades can also be provided by other diaphragm blade groups in the same manner. Accordingly, the present embodiment can reduce the size of the outside shape (in the radial direction) of the device.

Embodiment 1 is effective for the amount of warp between the diaphragm blades. In order to make the aperture shape close to a circular shape, methods involving increasing the number of diaphragm blades of the diaphragm blade groups have hitherto been used. Increasing the number of diaphragm blades increases the warp load, making it impossible to form a small aperture diameter. In the present embodiment, a small aperture is formed by a diaphragm blade group intended for small apertures, and it is therefore possible to achieve a circular shape formed by a small aperture, without increasing the number of diaphragm blades of diaphragm blade groups.

Figure 12:
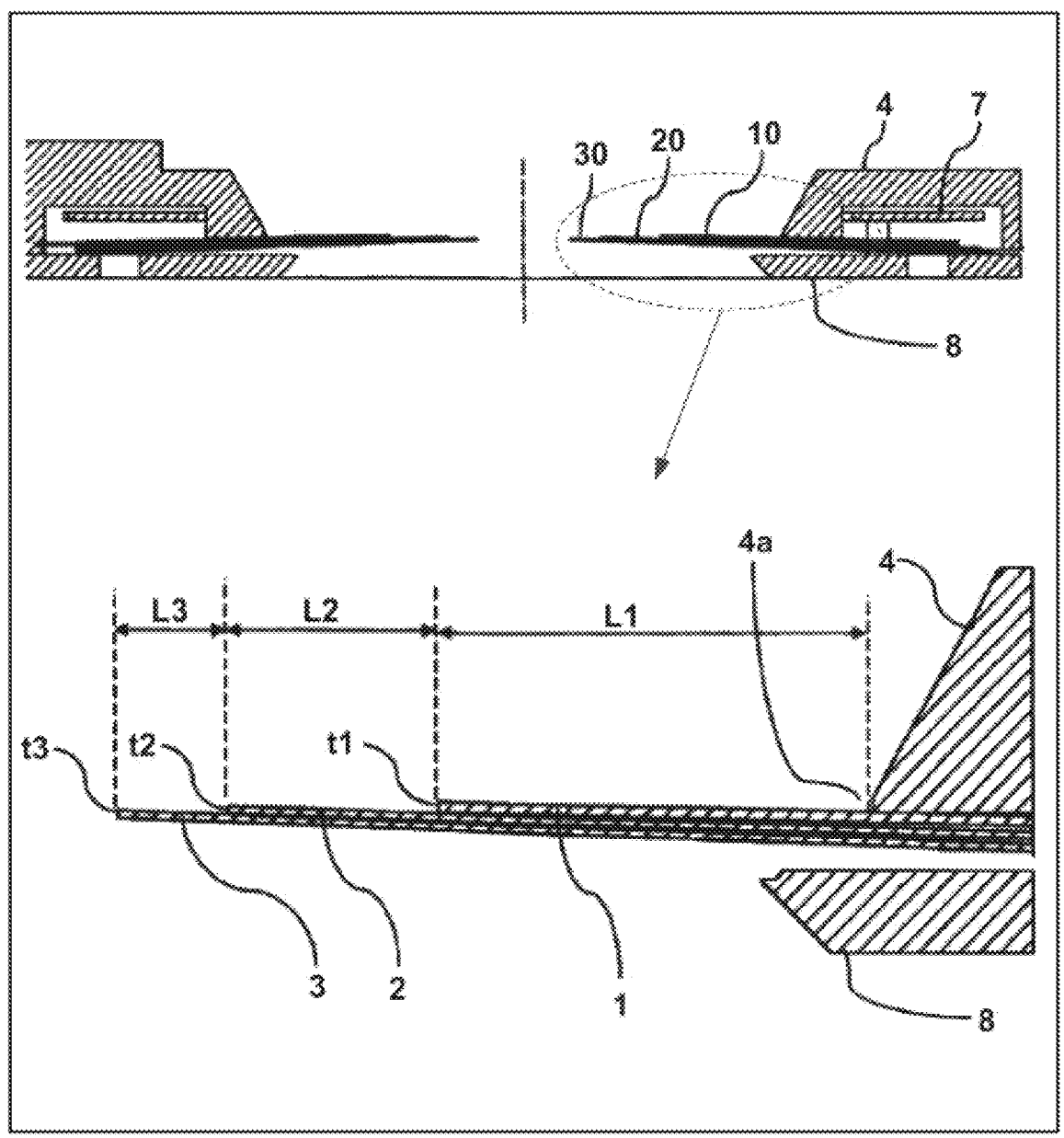
FIG. 12 is a cross-sectional view of Embodiment 1.

FIG. 12 shows a cross-sectional view of Embodiment 1 and a partial enlarged view thereof. Although the diaphragm blade groups 10 to 30 may be warped on either the base member 4 side or the case member 8 side, a description will be given here for a case where they have been warped on the base member 4 side. In the process of changing from a full aperture to a minimum aperture, first, the first diaphragm blade group 10 enters the inside of the opening portion 4a of the base member 4 to form an aperture. Next, the second diaphragm blade group 20 enters the inside of the aperture formed by the first diaphragm blade group 10 to form an aperture. Next, the third diaphragm blade group 30 enters the inside of the aperture formed by the second diaphragm blade group 20 to form an aperture, and the minimum aperture is reached.

At this time, the first diaphragm blade group 10 is assembled such that the distal ends of the diaphragm blades are warped toward the direction of the base member 4. Accordingly, the warp of the first diaphragm blade group 10 is suppressed by the opening portion 4a of the base member 4. The second diaphragm blade group 20 is assembled such that the distal ends of the diaphragm blades are warped toward the direction of the first diaphragm blade group 10. Accordingly, the warp of the second diaphragm blade group 20 can be suppressed by the aperture formed by the first diaphragm blade group 10. The third diaphragm blade group 30 is assembled such that the distal ends of the diaphragm blades are warped toward the direction of the second diaphragm blade group 20. Accordingly, the warp of the third diaphragm blade group 30 can be suppressed by the aperture formed by the second diaphragm blade group 20.

In the small-aperture state, the aperture of the first diaphragm blade group 10 is formed at a distance of L1 from the opening portion 4a of the base member 4. The aperture of the second diaphragm blade group 20 is formed at a distance of L1+L2 from the opening portion 4a of the base member 4. The aperture of the third diaphragm blade group 30 is formed at a distance of L1+L2+L3 from the opening portion 4a of the base member 4.

Here, the thicknesses of the diaphragm blades of all the diaphragm blade groups may be the same. However, a thickness of the first diaphragm blade group 10 that is larger than the thicknesses of the other diaphragm blade groups 20 and 30 is more effective in terms of warp.

When being warped in the direction of the base member 4, the second diaphragm blade group 20 is held down by the first diaphragm blade group 10. The thickness t2 of the diaphragm blades 2 of the second diaphragm blade group 20 is smaller than the thickness t1 of the diaphragm blades of the first diaphragm blade group 10. Accordingly, the amount of warp of the second diaphragm blade group 20 is larger than the amount of warp of the first diaphragm blade group 10, and, therefore, the amount of warp of the second diaphragm blade group 20 is suppressed by the first diaphragm blade group 10. Even though the thickness of the diaphragm blade 2 is small, the second diaphragm blade group 20 protrudes from the first diaphragm blade group 10 only by L2, and thus has very small effect on deformation or the like.

When being warped in the direction of the base member 4, the third diaphragm blade group 30 is held down by the second diaphragm blade group 20. The thickness t3 of the diaphragm blades of the third diaphragm blade group 30 is smaller than the thickness t1 of the diaphragm blades of the first diaphragm blade group 10. Accordingly, the amount of warp of the third diaphragm blade group 30 is larger than the amount of warp of the second diaphragm blade group 20, and, therefore, the amount of warp of the third diaphragm blade group 30 is suppressed by the second and first diaphragm blade groups 20 and 10. Also, the second diaphragm blade group 20 is pressed by the first diaphragm blade group 10 as described above, and, therefore, has an amount of warp smaller than that of the second diaphragm blade group 20 alone, and thus further presses the third diaphragm blade group 30. Even though the thickness of the diaphragm blade 3 is small, the third diaphragm blade group 30 protrudes from the second diaphragm blade group 20 by only L3, and thus has very small effect on deformation or the like.

The amount of warp of each of the diaphragm blade groups is suppressed by another diaphragm blade group adjacent thereto, so that warp is reduced, making it possible to reduce the thickness of the device. Furthermore, since the shapes of the apertures of the adjacent diaphragm blade groups are changed while the diaphragm blade groups are sliding against each other, there is no change in the apertures in the optical axis direction even when the diaphragm blade group to form an aperture is switched, which is also effective in terms of the optical performance.

Note that even after protruding toward the aperture center by L1, the first diaphragm blade group 10 is biased by the driving pins 7d being moved with the rotation of the driving ring 7. At this time, in Embodiment 1, for each cam groove (first cam groove) of the first diaphragm blade group 10 provided at a position that protrudes by L1, a cam groove is formed (second cam groove) such that the subsequent portion is a dead zone. By doing so, the first diaphragm blade group 10 stays at a position at which the aperture formed by the first diaphragm blade group 10 is the minimum aperture, making it possible to achieve the above-described reduction in the amounts of warp of the second and third diaphragm blade groups 20 and 30. Needless to say, the first cam groove and the second cam groove are provided continuously. With this configuration, after forming a light passage opening as a result of the pivoting of the driving ring, the first diaphragm blade 10 stays in the opening portion 4a of the base member 4 while the second and third diaphragm blades 20 and 30 are forming a light passage opening. As a result, the first diaphragm blade 10 holds down the second and third diaphragm blades 20 and 30 protruding further to the aperture center side than the first diaphragm blade 10, thus reducing the warp.

In contrast, rather than the second cam groove serving as a dead zone, the second cam groove may be formed such that, for example, as the driving pin 7d passes through the second cam groove, the first diaphragm blade group 10 protrudes further to the aperture center side from a position at which the aperture is minimum. In this case, it is either the second diaphragm blade group 20 or the third diaphragm blade group 30 that forms a light passage opening while the driving pin 7d passes through the second cam groove. During this time, the amount by which the second or third diaphragm blade group 20 or 30 is pressed by the first diaphragm blade group 10 can be made larger than L1. Accordingly, it is possible to enhance the above-described effect of reducing the warp of the second diaphragm blade group 20 and the third diaphragm blade group.

On the other hand, the second cam groove may be formed such that, as the driving pins 7d passes through the second cam groove, the first diaphragm blade group 10 is pulled toward the opening portion 4a of the base member 4 from the position at which the aperture is minimum. In this case, for example, when the first diaphragm blade group 10 is formed to have a small thickness and is configured to protrude to the aperture center side by L1 or more so as to press the second and third diaphragm blade groups 20 and 30 as described above, the first diaphragm blade group 10 itself tends to be warped as a result of the first diaphragm blade group 10 protruding by L1 or more, so that the degree of pressing the second diaphragm blade group 20, 30 may be reduced. In that case, the amount of warp of the first diaphragm blade group 10 itself is reduced by forming the second cam groove such that the first diaphragm blade group 10 is pulled toward the opening portion 4a of the base member 4. Accordingly, the effect of pressing the second and third diaphragm blade groups 20 and 30 can be enhanced, which is effective.

Note that the above-described method of forming the second cam groove also applies to the second diaphragm blade group 20. In that case, it is preferable that the second cam grooves of the first and second blade groups 10 and 20 are formed such that the first and second blade groups 10 and 20 move to the same side relative to the aperture center. Note, however, that the above-described second cam grooves may not be necessarily formed such that the first and second blade groups 10 and 20 are moved to the same side. In the case where the first diaphragm blade group 10 and the second diaphragm blade group 20 are warped in different manners, for example, when they are formed of different materials, the directions of movement of the first and second diaphragm blade groups 10 and 20 may be different. Note that although the term "movement" is used, diaphragm blade groups that do not move relative to the dead zone, or in other words, the aperture center side, are also included, of course.

Furthermore, by setting the direction of warp of the diaphragm blade groups as shown in FIG. 12, it is possible to suppress the change in the position of the optical axis direction in the process from a full aperture to a minimum aperture.

With Embodiment 1, it is possible to further reduce the thickness of a portion in which an aperture is formed than with the conventional technique. Even when the thickness of the diaphragm blades is reduced to half the thickness of the conventional diaphragm blade, a diaphragm blade group operates while sliding against another diaphragm blade group adjacent thereto, and thus the diaphragm blade groups can complement each other in strength.

That is, the circular shape can be maintained for a small aperture range, while the thickness is kept comparable to that of the conventional blade driving device. In addition, the thickness of an end face portion that forms an aperture can be reduced as compared to the conventional device. Accordingly, it is possible to reduce the end face reflection or the like, which is effective in terms of the optical performance.

Figure 12A:
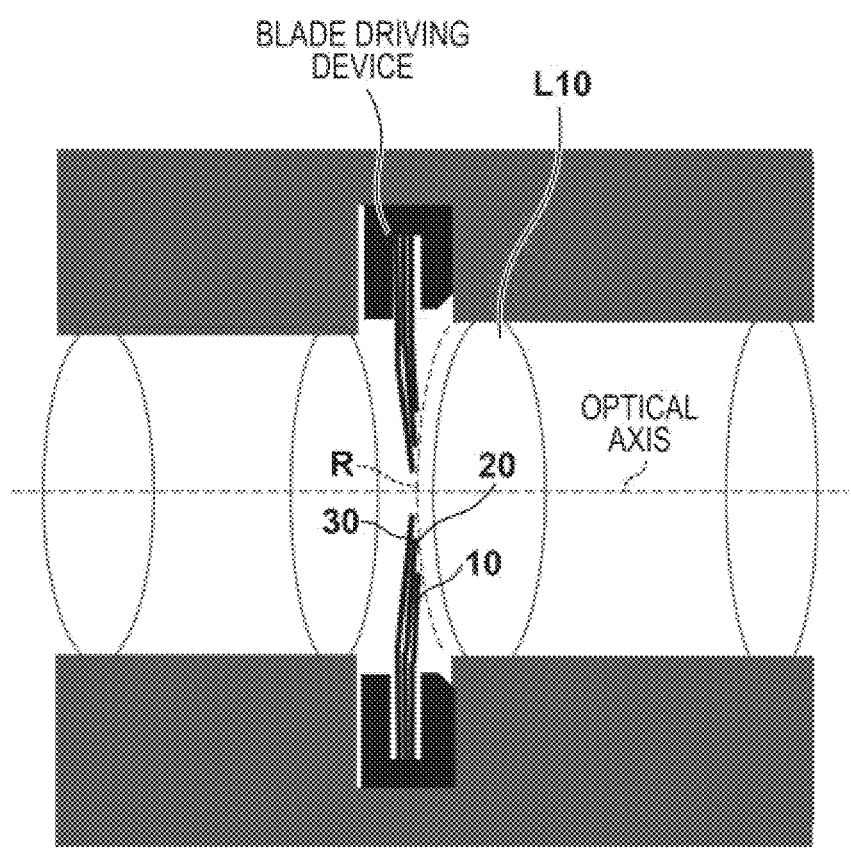
FIG. 12A is a cross-sectional view of the blade driving device according to Embodiment 1 and a lens.
Figure 12B:
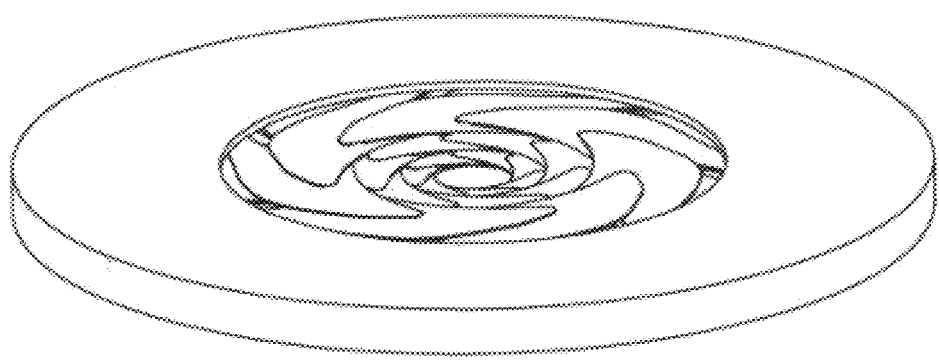
FIG. 12B is a diagram showing a warped state of the blade driving device of Embodiment 1.
Figure 12C:
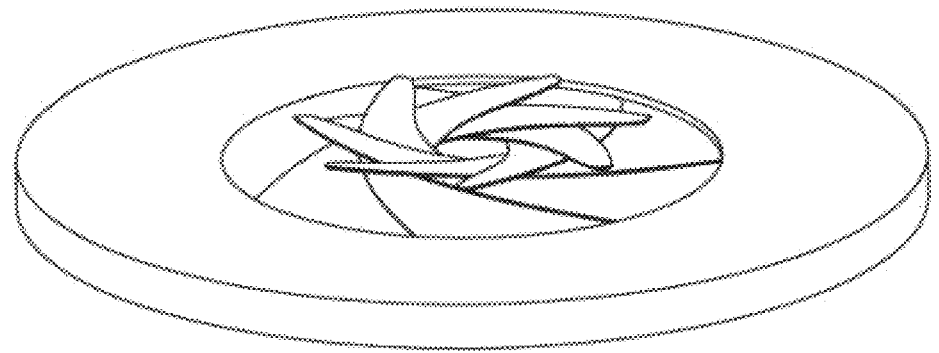
FIG. 12C is a diagram showing a warped state of a conventional blade driving device.

Furthermore, the multilayer structure of the diaphragm blade groups of Embodiment 1 makes it possible to decrease the distance from a lens when the device is incorporated into a lens barrel. FIG. 12A is a diagram showing the blade driving device of Embodiment 1 incorporated in a lens barrel. The diaphragm blades of each layer are warped in one direction, and are held down by the adjacent layer. The diaphragm blade group 30, which is closer to the optical axis center, is held down by the other blades, and thus has the smallest amount of warp. The diaphragm blade 20, which is closer to the optical axis center next to the diaphragm blade group 30, is held down by the diaphragm blade group 10, and thus has the second smallest amount of warp. Finally, the diaphragm blade group 10, which is farthest from the optical axis center, has the third smallest amount of warp. The line connecting the opening forming edge portions of these diaphragm blade groups forms a curved line R that is more recessed toward the center. Accordingly, placing a lens L10 protruding further toward the warp side of the blade driving device so as to follow the curved line R can further contribute to the thickness reduction of the optical apparatus. That is, the blade driving device of the present embodiment can decrease the distance from the lens, and thus can increase the degree of freedom in optical design, making it possible to contribute to the enhancement of the optical characteristics, the size reduction, and the thickness reduction of the optical apparatus. Of course, it is also possible to place a lens that is recessed or flatten toward the warp side of the blade driving device. FIG. 12B shows a diagram of a warped state of the diaphragm blade of Embodiment 1, and FIG. 12C shows a warped state of a diaphragm blade of a conventional blade driving device. Embodiment 1 has an overwhelmingly smaller amount of warp of the diaphragm blades than that of the conventional product.

Embodiment 2

FIG. 13 shows an exploded perspective view of a blade driving device according to Embodiment 2 of the present invention. Only the components different from those of Embodiment 1 will be described. In Embodiment 2, two partition members 9 are provided. One of the partition members 9 is a partition member that cushions the contact between the diaphragm blade group 10 and the diaphragm blade group 20. The remaining one of the partition members 9 is a partition member that cushions the contact between the diaphragm blade group 20 and the diaphragm blade group 30. Addition of the partition members 9 can prevent the contact resistance between the diaphragm blades, and catching with the outside shape and the cam grooves or the like, making it possible to stably drive the diaphragm device.

Embodiment 3

FIG. 14 shows an exploded perspective view of a blade driving device according to Embodiment 3 of the present invention. Embodiment 3 is an embodiment in which the arrangement of the diaphragm blades is changed from Embodiment 1, and the constituent parts and the driving method are the same as those of Embodiment 1. In Embodiment 3, a diaphragm blade 1, a diaphragm blade 2, and a diaphragm blade 3 constitute a diaphragm blade group 50.

A plurality of the diaphragm blade groups are configured in a ring form at the opening portion 4a of the base member 4. In the case of this configuration, a plurality of types of diaphragm blades are alternately stacked on one another. Accordingly, even when the thicknesses of several types of diaphragm blades are reduced, these diaphragm blades can be sandwiched by the other diaphragm blades, thus making it possible to reduce the thickness of the device.

Embodiment 4

Figure 15:
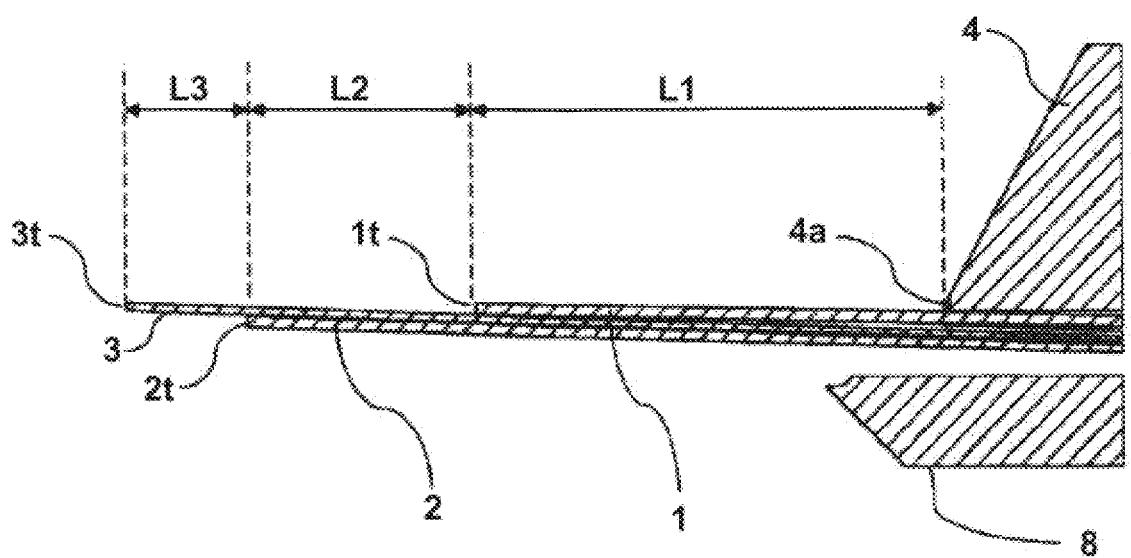
FIG. 15 is a cross-sectional view according to Embodiment 4 of the present invention

FIG. 15 shows a cross-sectional view of a blade driving device according to Embodiment 4 of the present invention. This embodiment is an embodiment in which the arrangements of the diaphragm blades 1 to 3 are changed from Embodiment 1, and the constituent parts and the driving method are the same as those of Embodiment 1. Embodiment 4 has a configuration in which the diaphragm blade 3 that forms a minimum aperture diameter is sandwiched by the diaphragm blade 1 and the diaphragm blade 2. Since the diaphragm blade 3 is sandwiched by the diaphragm blade 1 and the diaphragm blade 2, the diaphragm blade 3 cannot be easily bent even when the thickness 3t is reduced.

With Embodiment 4, it is possible to reduce the thickness of a portion at which an aperture is formed. Accordingly, it is possible to reduce the amount of warp of the diaphragm blades. In addition, the operating load imposed by warp is reduced, which is also effective for high-speed driving and stable driving.

Embodiment 5

Figure 16:
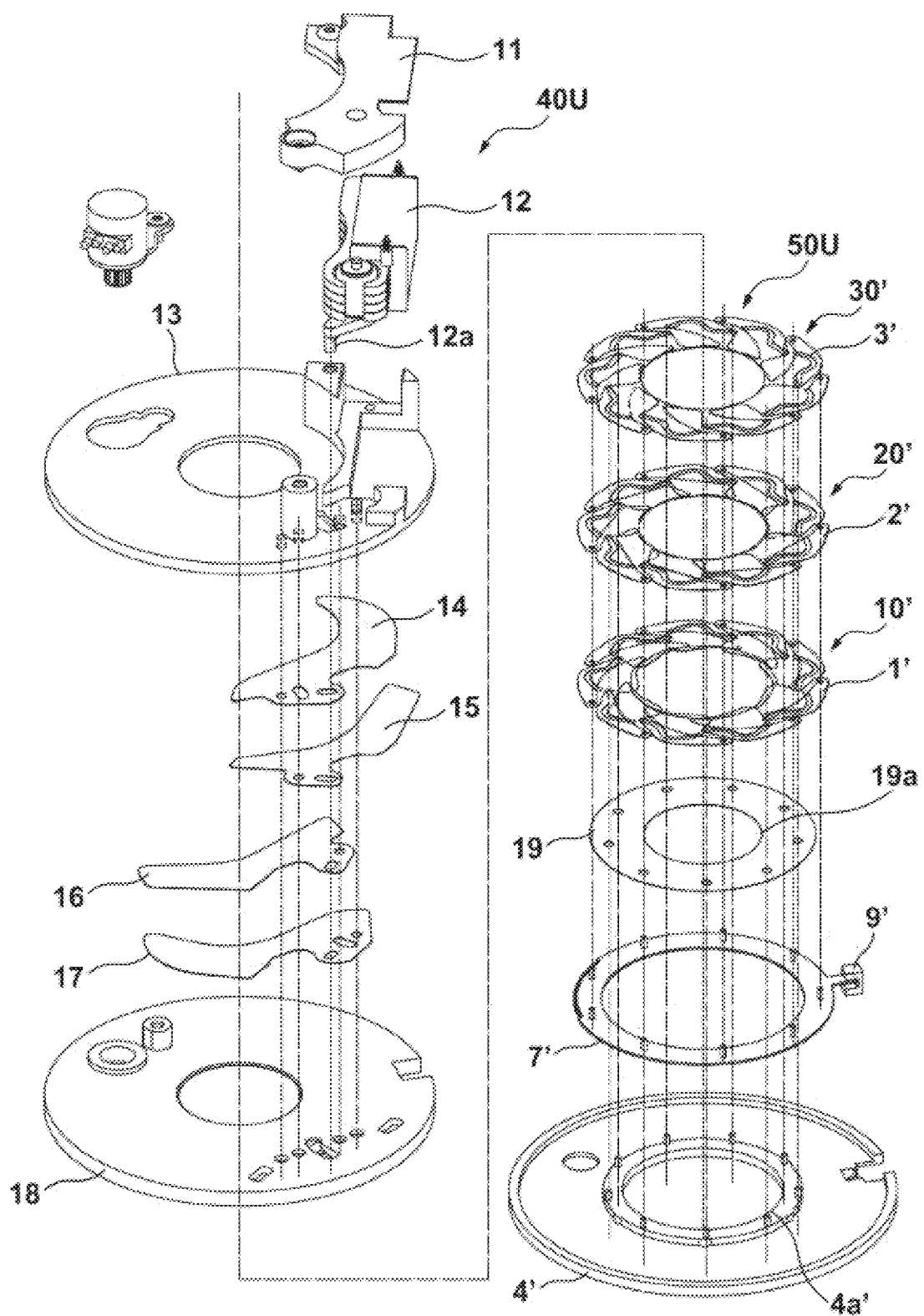
FIG. 16 is an exploded perspective view of a blade driving device according to Embodiment 5 of the present invention.

FIG. 16 shows an exploded perspective view of a light amount adjustment apparatus according to Embodiment 5 of the present invention. This embodiment is an embodiment in which a shutter device has been added to Embodiment 1, and is composed of a shutter unit 40U and a diaphragm unit 50U.

The shutter unit 40U includes a structure in which shutter blades 14, 15, 16, and 17 are supported by a pin provided on a first base member 13, and each of the shutter blades is pivoted by an output pin 12a of a motor 12. To the underside of the shutter unit 40U, a partition plate 18 is bonded so as to form a travelling space for the shutter blades between the first base member 13 and the partition plate 18. Here, the first base member 13 and the partition plate 18 each have an optical path opening formed therein. As a result of each of the shutter blades being pivoted, it is possible to open or close the optical path opening, thus adjusting the light amount.

Next, a diaphragm unit 50U of Embodiment 5 will be described. The diaphragm unit 50U is a blade driving device similar to that of Embodiment 1. The difference from Embodiment 1 lies in that the number of diaphragm blades per group is nine, and an opening forming member 19 is included. The components corresponding to those of the Embodiment 1 are denoted by the corresponding reference numerals to which an apostrophe is attached. For example, a base member 4' corresponds to the base member 4 of Embodiment 1.

Since the diaphragm unit 50U includes a larger number of blades per blade group than that of Embodiment 1, the circularity of the apertures thereof can be more easily ensured.

The opening forming member 19 is disposed between diaphragm blade groups 10' to 30' and a driving ring 7', and includes an opening portion 19a. The opening portion 19a is smaller than the openings of the first base member 13, the partition plate 18, the driving ring 7', and a second base member 4', and thus constitutes an optical opening in a state in which each of the diaphragm blades and the shutter blades is fully open.

Here, using another opening member having an opening diameter different from that of the opening portion 19a may enable the light amount adjustment apparatus of the present embodiment to be applied to a lens barrel having a different optical system.

Note that although the opening forming member 19 in the present embodiment is disposed between the diaphragm blade groups and the driving ring 7, the position of the opening forming member 19 is not limited to this position. For example, the opening forming member 19 may be disposed between the diaphragm blade group 10' and the diaphragm blade group 20', or may be disposed inside the travelling space of the shutter blades.

In the case of combining a shutter device such as the shutter device 40U with the conventional blade driving device shown in FIG. 12C, there is the problem that vibrations occurring during the operation of the shutter device may release the warp of the diaphragm blades, resulting in a change in aperture. However, with each of the blade driving devices according to the above-described embodiments, the warp of the diaphragm blades is suitably suppressed, and, therefore, there is little change in aperture caused by such vibrations.

Embodiment 6

Figure 17:
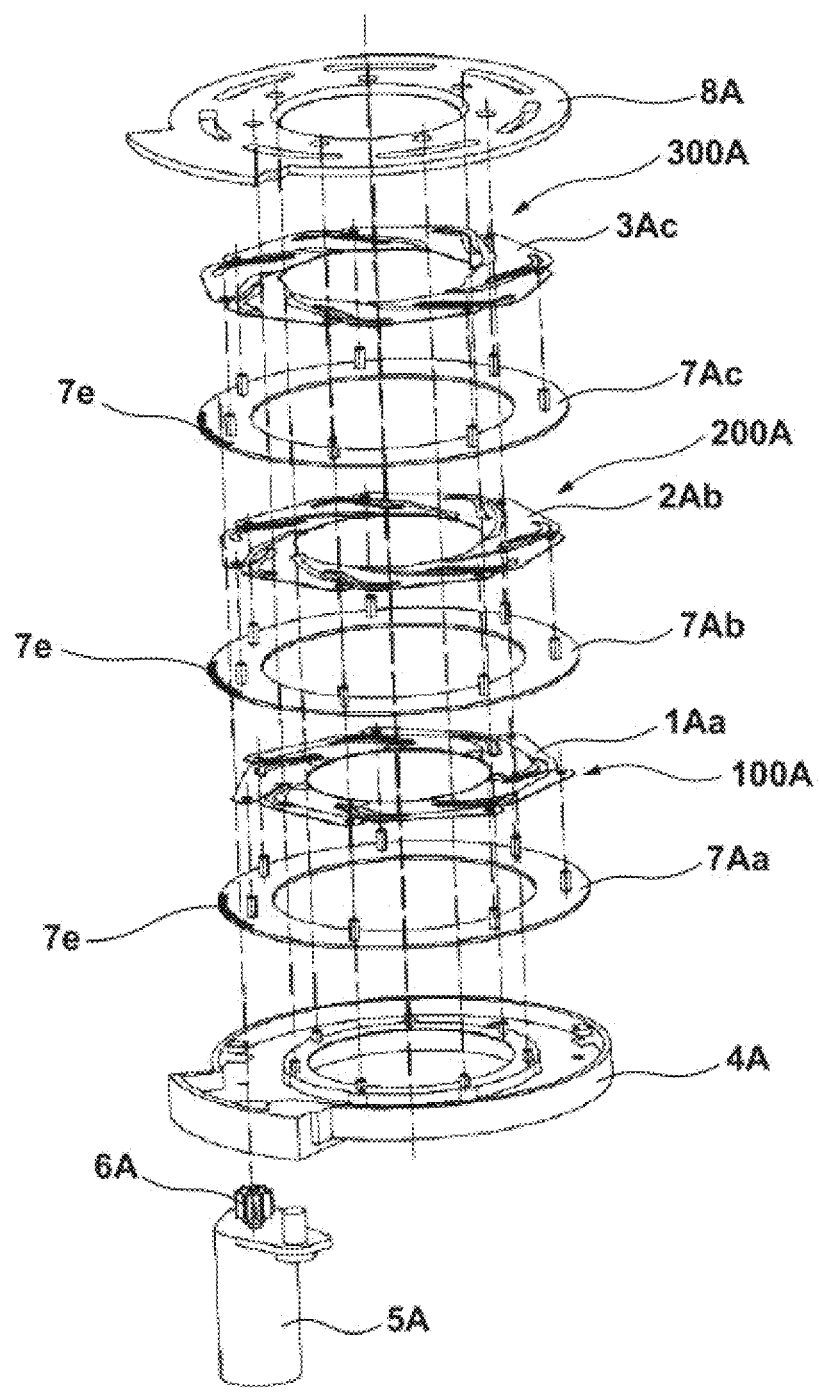
FIG. 17 is an exploded perspective view of a blade driving device according to Embodiment 6 of the present invention.

FIG. 17 shows an exploded perspective view of a light amount adjustment apparatus that uses a blade driving device according to Embodiment 6 of the present invention. This embodiment is basically the same as the above-described embodiments except that an improved driving portion 5A is provided in Embodiment 1.

With the light amount adjustment apparatus of the present embodiment, three driving rings 7Aa, 7Ab, and 7Ac can be simultaneously driven by one driving portion 5A as in the case of Embodiment 1. Moreover, it is possible to select between the driving rings 7Aa, 7Ab, and 7Ac that move and drive a pinion 6A together with the rotational shaft of the driving portion 5A within the driving portion 5A in a state in which the driving portion 5A is fixed to a base member 4A, in the axis direction of the rotational shaft, or in other words, a direction parallel to the optical axis direction.

Here, a first diaphragm blade group 100A composed of first diaphragm blades 1Aa, a second diaphragm blade group 200A composed of second diaphragm blades 2Ab, and a third diaphragm blade group 300A composed of third diaphragm blades 3Ac are connected to the driving rings 7Aa, 7Ab, and 7Ac, respectively.

In the present embodiment, as shown in FIG. 17, the driving ring 7Aa, the first diaphragm blade group 100A, the driving ring 7Ab, the second diaphragm blade group 200A, the driving ring 7Ac, and the third diaphragm blade group 300A are stacked in this order from the base member 4A side. That is, the first and second diaphragm blades group 100A and 200A travel in blade chambers between the driving rings 7Aa, 7Ab, and 7Ac, and the third diaphragm blade group 300A travels in a blade chamber between the driving ring 7Ac and a case member 8A.

In addition, the driving rings 7Aa, 7Ab, and 7Ac are each provided with a driven portion 7e at the same position in the circumferential direction. Then, by making the protruding length of the rotational shaft of the driving portion 5A from the driving portion 5A variable, the pinion 6A that is engaged with the driven portions 7e can be moved to (1) a position at which it is engaged with all the three driving rings 7Aa, 7Ab, and 7Ac, (2) a position at which it is engaged with the two adjacent driving ring 7Aa and 7Ab, (3) a position at which it is engaged with the two adjacent driving rings 7Ab and 7Ac, (4) a position at which it is engaged with only the driving ring 7Aa, and (5) a position at which it is engaged with only the driving ring 7Ac.

Consequently, according to the present embodiment, five driving patterns are selectable, and, therefore, a plurality of light amount adjustment patterns can be set. Accordingly, it is possible to perform light amount adjustment according to the image capturing mode, thus making it possible to capture an image with the light amount desired by the user. Additionally, in the case of performing the light amount adjustments (2) to (5) above, the load imposed on the driving portion 5A can be reduced as compared with the case of (1) above.

Note that the driving rings 7Aa, 7Ab, and 7Ac may be separately driven by changing the position of the pinion 6A. In this case, the three driving rings 7Aa, 7Ab, and 7Ac cannot be driven simultaneously. However, the same light amount adjustment can be performed by driving the driving rings 7Aa, 7Ab, and 7Ac one by one. Alternatively, the position of the driving portion 5A in the optical axis direction relative to the base member 4A may be changed by another driving portion being interposed such that the distance between the driving portion 5A and the base member 4A can be varied, thereby driving the driving rings 7Aa, 7Ab, and 7Ac by establishing engagement therewith.

Embodiment 7

Figure 18:
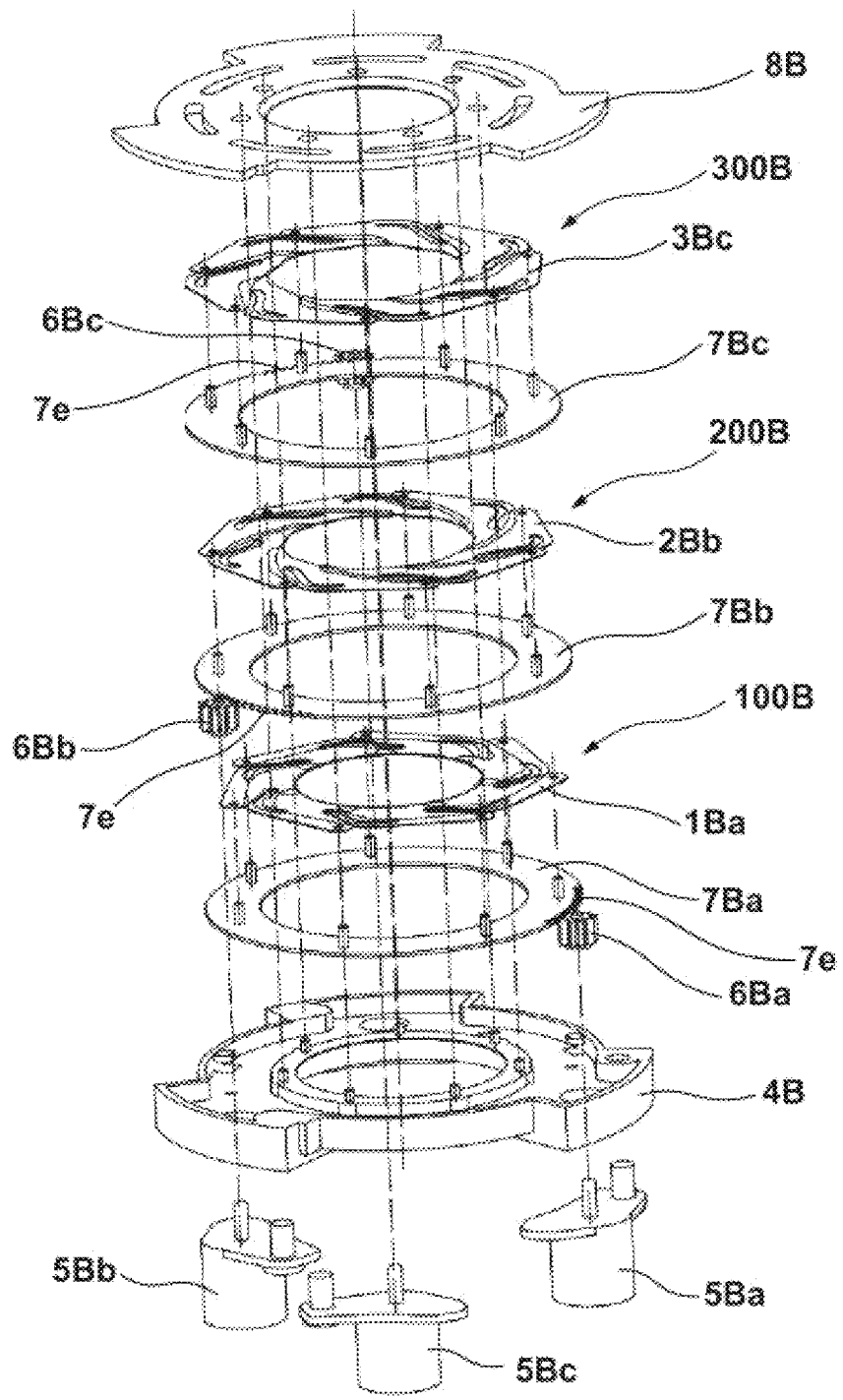
FIG. 18 is an exploded perspective view of a blade driving device according to Embodiment 7 of the present invention.

FIG. 18 shows an exploded perspective view of a light amount adjustment apparatus that uses a blade driving device according to Embodiment 7 of the present invention. This embodiment is basically the same as the above-described embodiments except that separate driving portions 5Ba, 5Bb, and 5Bc are provided for driving rings 7Ba, 7Bb, and 7Bc in Embodiment 1.

With the light amount adjustment apparatus of the present embodiment, the three driving rings 7Ba, 7Bb, and 7Bc can be simultaneously driven by simultaneously driving the three driving portions 5Ba, 5Bb, and 5Bc as in the case of Embodiment 1. On the other hand, the driving rings 7Ba, 7Bb, and 7Bc can be independently driven by separately driving the driving portions 5Ba, 5Bb, and 5Bc in a state in which the driving portions 5Ba, 5Bb, and 5Bc are fixed to the base member 4B.

Here, a first diaphragm blade group 100B composed of first diaphragm blades 1Ba, a second diaphragm blade group 200B composed of second diaphragm blades 2Ab, and a third diaphragm blade group 300B composed of third diaphragm blades 3Bc are connected to the driving rings 7Ba, 7Bb, and 7Bc, respectively.

In addition, the driving rings 7Ba, 7Bb, and 7Bc are each provided with a driven portion 7e at the same position in the circumferential direction. Then, pinions 6Ba, 6Bb, and 6Bc of the driving portions 5Ba, 5Bb, and 5Bc are engaged with the driven portions 7e. Accordingly, by individually driving the driving portions 5Ba, 5Bb, and 5Bc, the driving rings 7Ba, 7Bb, and 7Bc are separately driven so as to separately drive the first diaphragm blade group 100B, the second diaphragm blade group 200B, and the third diaphragm blade group 300B, making it possible to perform various light amount adjustments.

Thus, according to the present embodiment, a plurality of driving patterns, including, a case where all the driving rings 7Ba, 7Bb, and 7Bc are simultaneously driven, are selectable. However, separately driving the driving rings 7Ba, 7Bb, and 7Bc requires a less load during driving and can achieve power saving, as compared with a case where all the driving rings 7Ba, 7Bb, and 7Bc are driven. In addition, the light amount adjustment can also be quickly performed by high-speed driving.

Note that in the case of adopting configurations as described in Embodiments 6 and 7 above, a partition plate may be placed, for example, in a gap between the first diaphragm blade group and the driving ring that drives the second diaphragm blade group, and also a gap between the second diaphragm blade group and the driving ring that drives the third diaphragm blade group, thus dividing the upper and lower drive systems. This can prevent direct sliding (interference) between the driving components.

Supplementary Notes

Although the present invention has been described in detail base on specific embodiments thereof, the present invention is not limited to the above-described embodiments.

For example, an aspect of the present invention includes an opening forming member that forms an opening portion through which light passes; a plurality of groups of blades that are disposed around the opening portion of the opening forming member; and a pivot member that pivots the plurality of groups of blades around the opening portion, wherein, in a process of receiving power from the pivot member to pivot around the opening portion, the plurality of groups of blades form a plurality of circular light passage openings having different diameters by changing a combination of edge portions on the opening portion side of the blades that are linked together in a ring form.

According to such an aspect of the present invention, a plurality of circular light passage openings can be efficiently formed, and high-precision light amount adjustment and the like can be performed.

In the above-described embodiment, the opening forming member may include a plurality of fixing pins provided upright toward the plurality of groups of blades, the pivot member may include a plurality of driving pins provided upright toward the plurality of groups of blades, at least one of the fixing pins may be inserted in an optical axis direction in common through cam groove holes included in the blades stacked around the opening portion, and at least one of the driving pins may be inserted in the optical axis direction in common through rotation center holes included in the blades stacked around the opening portion.

According to such an embodiment, a plurality of pins are inserted so as to extend in common through a plurality of groups of blades, and, in that state, the plurality of groups of blades are interlocked by pivoting of the pivot member. Accordingly, the aspect is useful for size reduction of the device in a radial direction that is orthogonal to the optical axis direction.

In the above-described embodiment, the opening forming member may include a plurality of fixing pins provided upright toward the plurality of groups of blades, the pivot member may include a plurality of driving pins provided upright toward the plurality of groups of blades, at least one of the fixing pins may be inserted in an optical axis direction in common through rotation center holes included in the blades stacked around the opening portion, and at least one of the driving pins may be inserted in the optical axis direction in common through cam groove holes included in the blades stacked around the opening portion.

According to such an embodiment, a plurality of pins are inserted so as to extend in common through a plurality of groups of blades, and, in that state, the plurality of groups of blades are interlocked by pivoting of the pivot member. Accordingly, the aspect is useful for size reduction of the device in a radial direction that is orthogonal to the optical axis direction.

In the above-described embodiment, the plurality of groups of blades may come into a state in which the groups of blades slide against each other in the optical axis direction on an outer side of the opening portion.

According to such an embodiment, the cushioning effect between the blades provides an advantage to the size reduction of the device in the optical axis direction.

In the above-described embodiment, a partition member may be disposed between the groups of blades that constitute the plurality of groups of blades on an outer side of the opening portion.

According to such an embodiment, the blade travelling space of the blade groups can be divided by the partition member.

In the above-described embodiment, the plurality of groups of blades may include a first group of blades and a second group of blades, and, in a process of changing from a first circular light passage opening formed by the first group of blades to a second circular light passage opening formed by the second group of blades, the blades included in the first group of blades and the blades included in the second group of blades may be linked together in a ring form, thereby forming a circular light passage opening that is smaller than the first circular light passage opening and larger than the second circular light passage opening.

According to such an embodiment, a larger number of circular light passage openings can be efficiently formed.

In the above-described embodiment, the plurality of groups of blades may include a first group of blades and a second group of blades, in a process of changing from a first circular light passage opening formed by the first group of blades to a second circular light passage opening formed by the second group of blades, the first group of blades that is adjacent to the second group of blades and has finished forming the first circular light passage opening may remain, thereby acting to substantially suppressing warp, in an optical axis direction, of the second group of blades that forms the second circular light passage opening on an inner side thereof.

In the above-described embodiment, the plurality of groups of blades may include a first group of blades and a second group of blades, each of the first group of blades and the second group of blades may be provided with a hole with which a pin included in the opening forming member or the pivot member is engaged, and, in a process of pivoting of the plurality of groups of blades, the holes of the blades located in the opening portion may be shielded between the blades.

According to such an aspect of the present invention, light shielding in the optical axis direction can be performed between the plurality of blades.

In the above-described embodiment, a thickness of at least one of the plurality of groups of blades may be substantially smaller than a thickness of the other group of blades.

Such an embodiment is effective for size reduction of the device in the optical axis direction.

According to the present invention, the components of the embodiments described above can be used in combination. For example, in the case where each of the blade groups is provided with the driving ring and only the third diaphragm blade group is used for light amount adjustment (is used to form a light passage opening) as in Embodiment 7, the amount of warp of the third diaphragm blade group can be reduced when one of the first and second diaphragm blade groups is caused to enter the inside of the opening portion of the base member, while being prevented from passing the edge portion that is locking the aperture in the third blade group.

Another aspect of the present invention includes: an opening forming member that forms an opening portion through which light passes; a group of blades disposed around the opening portion of the opening forming member; a pivot member that pivots the blade group around the opening portion; a first engaging portion that is provided on the pivot member and is engaged with the blade group, and a second engaging portion that is provided on the opening forming member and is engaged with the blade group, wherein a plurality of the blade groups are included, and the first engaging portion the second engaging portion of the plurality of groups of blades overlap in an optical axis direction that is a direction of a normal of the opening portion.

In the above-described embodiment, the first engaging portion may be a first pin provided on the pivot member, the second engaging portion may be a second pin provided on the opening forming member, and the first pin and the second pin may extend continuously through the plurality of groups of blades.

In the above-described embodiment, the first pin may be a driving pin serving as a pivot center of a pivot operation of the blade group, and the second pin may be a cam pin that is engaged with a cam groove formed on the blade group.

In the above-described embodiment, the cam pin may be provided at a protruding portion protruding at the opening forming member in the optical axis direction, and the pivot member may be disposed so as to surround the protruding portion.

Yet another aspect of the present invention includes: a plurality of diaphragm blade groups that advance and retract into and from a light passage opening through which light passes to form a plurality of apertures having different diameters, and driving means that drives the plurality of diaphragm blade groups, wherein, in a process of causing the diaphragm blade groups to enter the light passage opening to sequentially form a plurality of apertures, peaks of loads received by the driving means from the diaphragm blade groups are dispersed.

In the above-described embodiment, the driving means may include a pivot member for advancing and retracting the light passage opening into and from the diaphragm blade groups. In the above-described aspect of the present invention, the diaphragm blade groups may each include a cam groove that is engaged with a cam pin provided on the pivot member, and peaks of loads received by the driving means are dispersed by cam shapes differing for each of the plurality of diaphragm blade groups.

In the above-described embodiment, the driving means may include a drive motor that pivots the pivot member, and loads received by the driving means from the plurality of diaphragm blade groups may be a load received by the drive motor as a result of driving the pivot member.

Note that the present invention is not limited to the above-described blade driving devices, and is widely applicable to optical apparatuses such as a camera.

According to such an embodiment, an optical apparatus including an excellent light amount adjustment function can be achieved by forming a plurality of circular light passage openings.

The invention claimed is:
1. A blade driving device comprising:
an opening forming member that forms an opening portion through which light passes;
a plurality of groups of blades that are disposed around the opening portion of the opening forming member; and
a pivot member that pivots the plurality of groups of blades around the opening portion,
wherein the plurality of groups of blades include a first group of blades and a second group of blades arranged toward one side in an optical axis direction with respect to the first group of blades,
wherein each blade of the second group of blades includes (a) a portion positioned, in the optical axis direction, under a portion of a first adjacent blade of the second group of blades, and (b) a portion positioned, in the optical axis direction, above a portion of a second adjacent blade of the second group of blades,
wherein the second group of blades is configured to form a circular light passage opening with warping toward the first group of blades,
wherein the opening forming member includes a plurality of fixing pins provided upright toward the plurality of groups of blades,
wherein each blade of the first group of blades and each blade of the second group of blades includes a cam groove hole,
wherein each fixing pin of the plurality of fixing pins is inserted through a cam groove hole of the cam groove holes included in the blades of the first group of blades and a cam groove hole of the cam groove holes included in the blades of the second group of blades,
wherein in a process of changing from a first circular light passage opening formed by the first group of blades to a second circular light passage opening, which is smaller than the first circular light passage opening, formed by the second group of blades on an inner side of the first circular light passage opening, the first group of blades that is adjacent to the second group of blades and has finished forming the first circular light passage opening remains in the opening portion without forming the second circular light passage opening so as to suppress warp, in the optical axis direction, of the second group of blades that forms the second circular light passage opening, by contacting with the second group of blades, and
wherein in a process in which the first group of blades forms the first circular light passage opening according to pivoting of the pivot member, each cam groove hole included in the blades of the second group of blades which enters an inside of the opening portion is shielded by the first group of blades.

2. The blade driving device according to claim 1, wherein, in a process of receiving power from the pivot member to pivot around the opening portion, the plurality of groups of blades form a plurality of circular light passage openings having different diameters by changing a combination of edge portions on the opening portion side of the blades that are linked together in a ring form.

3. The blade driving device according to claim 1, wherein the pivot member includes a plurality of driving pins provided upright toward the plurality of groups of blades, and
  wherein at least one of the driving pins is inserted in the optical axis direction in common through rotation center holes included in the blades stacked around the opening portion.

4. The blade driving device according to claim 1, wherein the plurality of groups of blades come into a state in which the groups of blades slide against each other in the optical axis direction on an outer side of the opening portion.

5. The blade driving device according to claim 1, wherein in the process of changing from the first circular light passage opening formed by the first group of blades to the second circular light passage opening formed by the second group of blades, the blades included in the first group of blades and the blades included in the second group of blades are linked together in a ring form, thereby forming a circular light passage opening that is smaller than the first circular light passage opening and larger than the second circular light passage opening.

6. The blade driving device according to claim 1, wherein a thickness of at least one of the plurality of groups of blades is substantially smaller than a thickness of the other group of blades.

7. An optical apparatus comprising the blade driving device according to claim 1.

8. A device comprising:
  an opening forming member that forms an opening portion through which light passes;
  a plurality of groups of blades that are disposed around the opening portion of the opening forming member; and
  a pivot member that pivots the plurality of groups of blades around the opening portion,
  wherein the plurality of groups of blades include a first group of blades and a second group of blades arranged toward one side in an optical axis direction with respect to the first group of blades,
  wherein each blade of the second group of blades includes (a) a portion positioned, in the optical axis direction, under a portion of a first adjacent blade of the second group of blades, and (b) a portion positioned, in the optical axis direction, above a portion of a second adjacent blade of the second group of blades,
  wherein the second group of blades is configured to form a circular light passage opening with warping toward the first group of blades,
  wherein the opening forming member includes a plurality of fixing pins provided upright toward the plurality of groups of blades,
  wherein each blade of the first group of blades and each blade of the second group of blades includes a cam groove hole,
  wherein each fixing pin of the plurality of fixing pins is inserted through a cam groove hole of the cam groove holes included in the blades of the first group of blades and a cam groove hole of the cam groove holes included in the blades of the second group of blades,
  wherein in a process of changing from a first circular light passage opening formed by the first group of blades to a second circular light passage opening, which is smaller than the first circular light passage, formed by the second group of blades on an inner side of the first circular light passage opening, the first group of blades that is adjacent to the second group of blades and has finished forming the first circular light passage opening remains in the opening portion without forming the second circular light passage opening so as to provide a force against warp, in an optical axis direction, of the second group of blades that forms the second circular light passage opening, by contacting with the second group of blades, and
  wherein in a process in which the first group of blades forms the first circular light passage opening according to pivoting of the pivot member, each cam groove hole included in the blades of the second group of blades which enters an inside of the opening portion is shielded by the first group of blades.

\* \* \* \* \*